(12) United States Patent
Beck et al.

(10) Patent No.: US 9,436,888 B2
(45) Date of Patent: Sep. 6, 2016

(54) METHOD AND SYSTEM FOR DETERMINING A BOUNDARY SURFACE NETWORK

(71) Applicant: SIEMENS AKTIENGESELLSCHAFT, Munich (DE)

(72) Inventors: Thomas Beck, Forchheim (DE); Dominik Bernhardt, Hausen (DE); Jan Kretschmer, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 677 days.

(21) Appl. No.: 13/776,987

(22) Filed: Feb. 26, 2013

(65) Prior Publication Data

US 2013/0223748 A1  Aug. 29, 2013

(30) Foreign Application Priority Data

Feb. 29, 2012 (DE) .......................... 10 2012 203 122

(51) Int. Cl.
*G06F 7/60* (2006.01)
*G06F 17/10* (2006.01)
*G06K 9/46* (2006.01)
(Continued)

(52) U.S. Cl.
CPC ......... *G06K 9/4604* (2013.01); *G06K 9/00201* (2013.01); *G06T 7/0085* (2013.01); *G06T 2207/10081* (2013.01); *G06T 2207/10088* (2013.01); *G06T 2207/30028* (2013.01); *G06T 2207/30061* (2013.01); *G06T 2207/30101* (2013.01)

(58) Field of Classification Search
None
See application file for complete search history.

(56) References Cited

U.S. PATENT DOCUMENTS

| | | | |
|---|---|---|---|
| 2002/0136440 A1* | 9/2002 | Yim et al. ..................... | 382/131 |
| 2004/0037467 A1* | 2/2004 | Wenzel ............... | G06K 9/6204 |
| | | | 382/203 |

(Continued)

FOREIGN PATENT DOCUMENTS

DE    102009006414 B3    9/2010

OTHER PUBLICATIONS

Sareen et al., Contour-based 3D Modeling Point Cloud Simplification for Modeling Freeform Surfaces, 2009, IEEE, pp. 381-386.*

(Continued)

*Primary Examiner* — Omar Fernandez Rivas
*Assistant Examiner* — Bernard E Cothran
(74) *Attorney, Agent, or Firm* — Harness, Dickey & Pierce

(57) ABSTRACT

A method is disclosed for determining a boundary surface network of a tubular object. An ordered series of contours is first supplied on the basis of image data in a source space. A transformation function is created for at least two consecutive contours in the series, and a unit space segment object is created in the unit space on the basis of the consecutive contours. A local signed distance function is determined in the unit space. In addition, a relative positional information of a query point is determined in the source space from a surface of a segment object in the source space, the segment object being based on the consecutive contours, on the basis of the local signed distance function in the unit space and using the transformation function. Finally, the boundary surface network is created on the basis of the relative positional information that has been determined.

17 Claims, 16 Drawing Sheets

(51) Int. Cl.
*G06K 9/00* (2006.01)
*G06T 7/00* (2006.01)

(56) References Cited

U.S. PATENT DOCUMENTS

2004/0249270 A1* 12/2004 Kondo et al. .................. 600/425
2009/0295801 A1* 12/2009 Fritz et al. .................... 345/424

OTHER PUBLICATIONS

German Patent Publication No. 10 2012 203 122.7 Dated Oct. 23, 2012.
William E. Lorensen, Marching Cubes: A High Resolution 3D Surface Construction Algorithm, ACM SIGGRAPH Computer Graphics, vol. 21, No. 4, pp. 163-169, Jul. 1987.
Fred L. Bookstein, Pricipal Warps: Thin-Plate Splines and the Decomposition of Deformations, IEEE Transactions on Pattern Analysis and Machine Intelligence, vol. 11, No. 6, Jun. 1989, pp. 567-585.
Stefan Grosskopf, Accurate, Fast and Robust Vessel Contour Segmentation of CTA Using an Adaptive Self-Learning Edge Model, Proceedings of SPIE, vol. 7259, 72594D, 2009.
K. Rohr, Landmark-Based Elastic Registration Using Approximating Thin-Plate Splines, IEEE Transactions on Medical Imaging, vol. 20, No. 6, Jun. 2001, pp. 526-534.
A. A. G. Requicha, Solid Modeling: A Historical Summary and Contemporary Assessment, IEEE Computer Graphics and Applications, Mar. 1982, pp. 9-24.
Michael Kazhdan, Unconstrained Isosurface Extraction on Arbitrary Octrees, Eurographics Symposium on Geometry Processing, 2007, pp. 125-133.
Mark A. Yerry, Automatic Three-Dimensional Mesh Generation by the Modified-Octree Technique, Intern. Journal for Numerical Methods in Engineering, vol. 20, 1984, pp. 1965-1990.
Anna Puig, Hybrid Model for Vascular Tree Structures, VisSyum 00: Joint Eurographics—IEEE TCVG Symposium on Visualization, 2000, pp. 125-136.

* cited by examiner

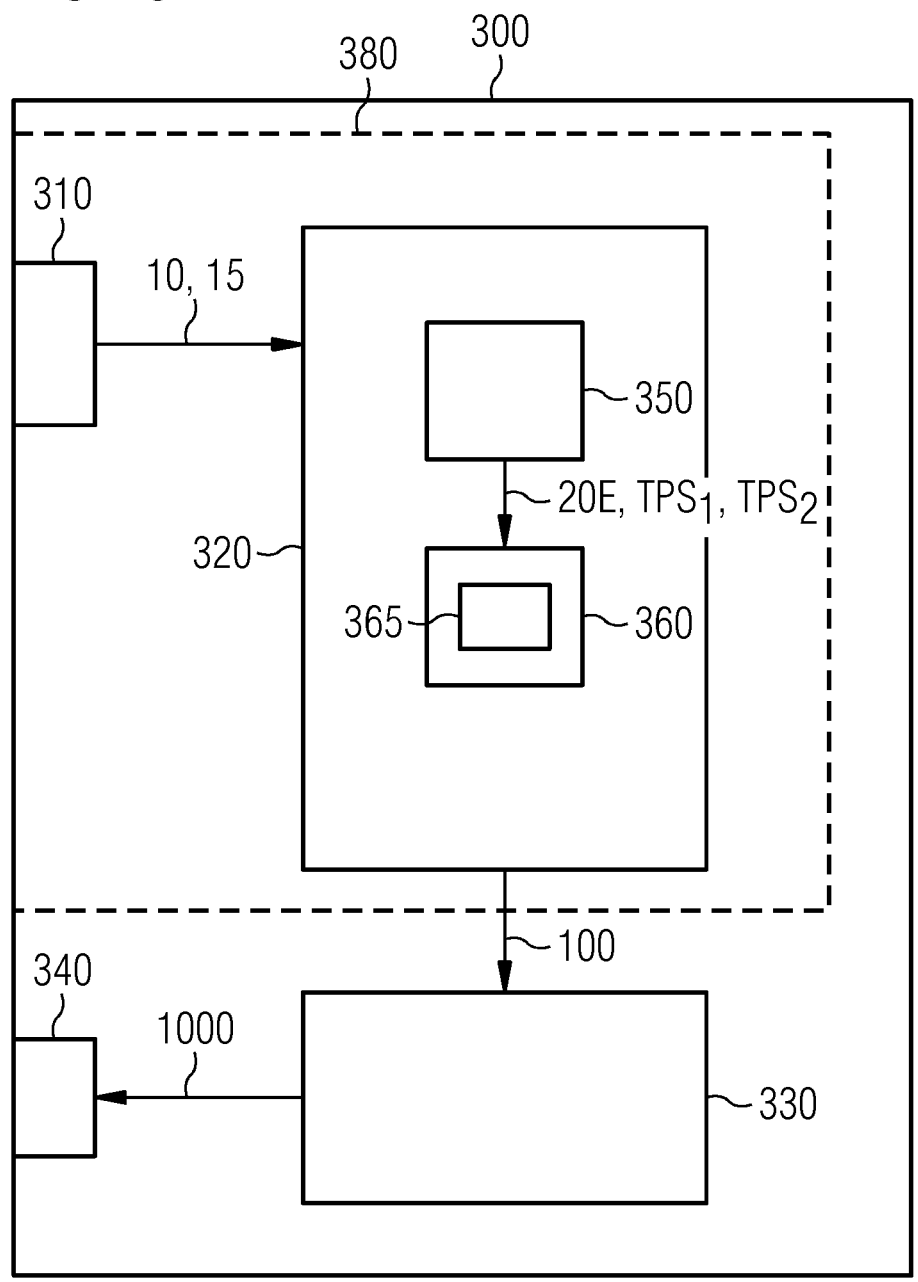

METHOD AND SYSTEM FOR DETERMINING A BOUNDARY SURFACE NETWORK

PRIORITY STATEMENT

The present application hereby claims priority under 35 U.S.C. §119 to European patent application number DE 10 2012 203 122.7 filed Feb. 29, 2012, the entire contents of which are hereby incorporated herein by reference.

FIELD

At least one embodiment of the present invention generally relates to a method for determining a boundary surface network of a tubular object, a boundary surface network determination system for determining a boundary surface network of a tubular object, and a segment object determination unit that can be used in such a boundary surface network determination system.

BACKGROUND

The image-based depiction of surfaces of a tubular object that has a complicated shape and possibly many branches, such as e.g. the bronchial system, a blood vessel system or other hollow organs, forms the basis for a multiplicity of analyses, particularly in the clinical field. For example, a wide diversity of problems can be identified by means of a virtual 'fly-through' through the hollow organ, the simulation of a liquid flow, or the detailed three-dimensional depiction of critical regions, such that further action can be effectively established in relation to the medical treatment in particular. This presupposes the availability of preferably complete information relating to the topological structure of the tubular object. Such information relating to the topological structure can be obtained e.g. by way of imaging methods such as computer tomography or magnetic resonance tomography, for example. Without further processing, the images and depictions thus obtained are not suitable or are only partly suitable for the cited analyses. The multidimensional description of the surface of the hollow organ by means of a boundary surface network depiction or a surface network model, subsequently referred to simply as a 'boundary surface network', provides the desired geometric information and is moreover intended also to express sufficient details of the surface for the cited analyses.

Methods for calculating a boundary surface network of a hollow organ in accurate detail, describing the surface by way of numerically complicated and computationally intensive interpolations, are known. The calculated boundary surface networks are generally characterized by excellent accuracy of detail. However, as a result of the huge computing effort involved, these depictions cannot be calculated at short notice or instantaneously, and therefore realtime manipulation, e.g. for the purpose of 'what-if' analyses (e.g. in order to simulate the insertion of a stent in a blood vessel), is only partly possible using these methods for calculating the boundary surface network.

The required speed in the determination of the boundary surface network can be achieved e.g. by simplifying the numerical effort by using the simplest possible model of the surface. In contrast with 'model-free' interpolation calculation methods based on the analysis of point clouds, such models use a set of simple geometric shapes such as e.g. cylinders or spheres to approximate the hollow organ that is to be reproduced. However, this approximation only rarely produces a boundary surface network of the hollow organ in which critical details are expressed with a sufficient degree of accuracy, particularly in the region of branch points. Consequently, these methods are unsuitable for precisely measuring geometric changes of the vascular system for the purpose of diagnosis and planned treatment of a pathology.

For the purpose of simulating a liquid flow, for example, the complete geometry and in particular the branches of the hollow organ must be expressed in a manner that is as far as possible identical to nature, further to which the calculated boundary surface network must often be 'waterproof', i.e. there must not be any openings that are not present in reality.

These requirements are only rarely satisfied by results from the model-based determination of a boundary surface network, however, since in particular the adaptation of the simple geometric basic shape is complicated if the size ratios of partial structures of the hollow organ vary significantly and if branches occur, for example. In particular, unwanted artifacts in the determined boundary surface network occur at branches because geometric basic model elements (e.g. spheres) that are often used for modeling project into each other, for example, and structures that are not present in reality are modeled in the interior of the determined boundary surface network. These boundary surface networks are only of limited use for the cited 'fly-through' applications, for example.

SUMMARY

At least one embodiment of the invention provides a system and/or method for rapidly determining a boundary surface network of a tubular object, wherein details of the surface structure can be expressed as accurately as possible and the generation of unwanted structures in the interior of the boundary surface network is preferably avoided completely.

A method is disclosed for determining a boundary surface network of a tubular object and a boundary surface network determination system is also disclosed.

According to at least one embodiment of the invention, a method comprising the following is proposed for determining a boundary surface network of a tubular object, preferably a hollow organ:

In a first step of the method, an ordered series of contours is supplied on the basis of image data in a so-called 'source space'. In this case, the tubular object can have a plurality of branches in particular. The tubular object is preferably a hollow organ as mentioned in the introduction, in particular a bronchial system or blood vessel system. The image data of this object may have been determined using e.g. a computer tomograph or a magnetic resonance tomograph, i.e. said image data is ultimately measurement data from these tomography systems or measurement data that has been reconstructed therefrom. It preferably comprises three-dimensional image data or a set of two-dimensional layer data covering a three-dimensional volume. The contours represent the geometric structure of the object at the location of the respective contour in a specific way. One example of this is the center line depiction (explained below), in which a plurality of center points are arranged one after the other in an ordered sequence on a center line through the tubular object, and the contours assigned to the center points represent in each case the shape of the object in a plane through this center point, the plane being preferably perpendicular relative to the center line. In this case, the contours can be adapted very precisely (even as freeform contours) to the image data in each case, i.e. to the exact shape of the object concerned. However, it is essentially also possible to use contours that are extremely simple, e.g. based on averaging of the image data. These can be e.g. circles or ellipses in this case.

The 'source space' in which the ordered series of contours is predetermined preferably corresponds to a space that is established independently of an examination object, in particular independently of the tubular object. The source space thus established is usually described in a so-called world coordinates system, which is established with reference to the measurement space of the imaging system used, in particular the cited tomography systems. This means that the origin of the world coordinates system is the center of the measurement space, for example, and a first coordinate axis runs in the direction of the longitudinal axis through the measurement space, whereas the other two coordinate axes are orthogonal relative to this first axis and to each other. In order to simplify further calculations, use is preferably made of an orthonormal system.

In a subsequent step of the method, provision is made for specifying a transformation function for at least two consecutive contours in the series, from this source space into a unit space.

The unit space is preferably a three-dimensional Euclidean space, which has a normalized length, width and height. The transformation function is preferably so designed as to preserve topology in respect of the interpolation of adjacent contours, meaning that the adjacent disposition of points of the source space is preserved as part of the transformation into the unit space, though this does not presuppose that the transformation function is so designed as to preserve distance.

In a further step of the method, provision is made for creating a unit space segment object in this unit space on the basis of the consecutive contours. A 'unit space segment object' that is topologically equivalent to the tubular object in the region of the contours is therefore created in the unit space, and can form the basis for advantageously deriving a boundary surface network. The unit space segment objects can have a geometry that is easy to describe and, for example, can be an object in the form of a cylinder or a truncated cone (i.e. a basic geometric body) in each case. In particular, the unit space segment object is designed such that a finite number of computational steps is sufficient to describe exactly the surface of the unit space segment object, and e.g. a closed function for describing the surface can be specified.

In a further step of the method according to at least one embodiment of the invention, provision is made for determining a local signed distance function in the unit space for the unit space segment object. As a result of restricting the depiction to a segment object in the unit space, in particular based on basic geometric bodies, it is possible to determine a local signed distance function which can be calculated quickly and easily and can then be used for determining the surface network. This means that, for query points which lie in the unit space and at which information concerning a position relative to the observed segment object is to be determined, the local signed distance function can again be specified by a finite number of computational steps in order to describe exactly the surface of the unit space segment object.

In this context, the local signed distance function expresses the interval to the closest surface of the unit space segment object for a desired query point in the unit space. At the same time, the separations differ in respect of their operational signs for query points that lie inside the unit space segment object and query points that lie outside the unit space segment object. For example, the local signed distance function can assign a negative function value to query points that lie inside the volume of the unit space segment object, a positive function value to query points that lie outside said volume, and a function value or separation of 'zero' to query points that lie on the surface of the unit space segment object.

In a further step of the method according to at least one embodiment of the invention, provision is made for determining relative positional information of a query point in the source space from a surface of a (original or imaginary) segment object in the source space, the segment object being based on the consecutive contours, on the basis of the local signed distance function in the unit space and using the transformation function.

As mentioned above, the alternation of operational signs can be used to characterize whether a query point lies inside or outside the unit space segment object volume, or the surface of the unit space segment object can be specified exactly if the local signed distance function is zero. The information relating to the operational sign of the local signed distance function therefore provides relative positional information in the unit space. Since the transformation function preserves topology, and therefore the relative position of query points is identical in the source space and unit space, the relative position in the unit space also specifies the position relative to a (preferably only imaginary or 'virtual') segment object in the source space, said segment object being specified by the contours.

For a query point in the source space, positional information relative to the 'virtual' segment object of the source space can therefore be determined very easily because the query point is transformed into the unit space by means of the transformation function, and operational sign information can be determined there by means of the local signed distance function.

In a further step of the method, provision is finally made for creating the boundary surface network on the basis of the relative positional information that has been determined. In particular, the relative positional information for a multiplicity of query points can be specified for this purpose. All of this information can then be used in a 'marching cubes' method, for example, to derive a boundary surface network for the surface of the tubular object.

According to at least one embodiment of the invention, provision is therefore made for performing an essentially model-based determination of a boundary surface network on the basis of a unit space segment object.

As mentioned above, the transformation function can be designed such that even complicated contours can be reproduced as simple objects in the unit space. This allows the efficient calculation of intervals and positional information relative to the unit space segment objects. The complexity of a contour in the source space or in world coordinates is captured in the transformation function, wherein this transformation function need only be determined once, such that access to the transformation function alone is sufficient. This means that if it is necessary to determine whether a query point in the source space lies inside or outside the tubular object, the transformation function that was determined once can be used. The method for determining the boundary network is therefore accelerated.

In summary, at least one embodiment of the invention optimizes the modeling in such a way that even complicated structures or contours can be captured in the form of a model, while nonetheless allowing very efficient and advantageous calculation of a boundary surface network of the tubular object. Of fundamental significance in this case is the insight in particular that the transformation function does not have to preserve distance in order to preserve relative positional information, meaning that provision is made for correctly expressing in respect of every query point whether the query point is located inside or outside the tubular object, such that the surface of the tubular object can be specified exactly by way of the transformation function.

At least one embodiment of the invention further proposes a segment object determination unit which is designed to specify a transformation function for transforming consecutive contours in an ordered series in each case from a source space into a unit space, and to create a unit space segment object in the unit space on the basis of the consecutive contours.

An inventive boundary surface network determination system of at least one embodiment, for determining a boundary network of a tubular object, comprises an input interface for supplying the ordered series of contours, these being preferably determined on the basis of image data, and also comprises the inventive segment object determination unit cited above.

The boundary network determination system further comprises a distance determination unit, which is designed to determine a separation from a unit space segment object on the basis of a signed distance function that is established respectively for each unit space segment object in the unit space. This interacts in particular with a position determination unit that is provided according to at least one embodiment of the invention.

This position determination unit is designed to determine relative positional information of a query point in the source space from a surface of a segment object in the source space, said segment object being based on the consecutive contours, on the basis of the local signed distance function. As mentioned above, the segment object in the source space does not actually have to be calculated in the source space according to the method described above and according to the boundary network determination system in this case, i.e. it can be a 'virtual' or 'imaginary' segment object. In order to implement the invention, it is sufficient merely for an ordered series of contours (e.g. in the form of a center line depiction) of the tubular object to be established in the source space.

According to at least one embodiment of the invention, the boundary network determination system also comprises an output interface for the output and supply of a boundary surface network on the basis of a multiplicity of relative positional information that is determined by way of the position determination unit.

Essential parts of the boundary network determination system can preferably be realized in the form of software on a suitable programmable computer unit (e.g. an image data handling unit or an evaluation facility) featuring corresponding storage devices. This relates in particular to the segment object determination unit, the distance determination unit and the position determination unit. For example, the input interface can be an interface for selecting and accepting data from a data storage entity, this being disposed within the boundary surface network determination system or connected thereto via a network, possibly involving the use of a user interface. The systems or units can also comprise output interfaces in each case, for the purpose of transferring the generated data to other entities for further processing, depiction, storage, etc. A largely software-based realization of the boundary surface network determination system has the advantage that existing image data handling units and the like can easily be upgraded by way of a software update in order to operate in the inventive manner.

At least one embodiment of the invention is also directed to a computer program product which is stored on a transportable storage entity and/or is available for transfer via a network and can therefore be loaded directly onto one or more storage entities of a boundary surface network determination system. The computer program product comprises program code sections in order to execute all of the steps of at least one embodiment of the inventive method described above when the program is executed in the boundary surface network determination system.

Further particularly advantageous embodiments and developments of the invention are derived from the dependent claims and from the following description, wherein the independent claims of one statutory class of claim can be developed in the same way as the dependent claims of another statutory class of claim.

In order to allow in particular the transfer of complicated contours of the source space into the unit space, thereby making it possible to generate a multiplicity of different unit space segment objects, each unit space segment object is preferably assigned a dedicated transformation function for transformation into the unit space. This means that an individual transformation function is preferably assigned to each consecutive subset of contours in the source space that are reproduced by a unit space segment object in the unit space. However, this does not preclude the transformation functions of two unit space segment objects being randomly identical to a given extent.

In particular, it is therefore possible for the contours in the source space to be freeform contours, i.e. any desired contours that preferably express the anatomy of the tubular object as accurately as possible, and can differ drastically from basic shapes such as circles or ellipses, can be used for a model-based reproduction of the tubular object. In particular, the contours in the source space can have completely different shapes.

The transformation functions are most preferably so-called 'thin-plate spline' transformations in each case.

In order to allow simple calculation of distances to the surface of the unit space segment object, it is particularly advantageous for the contours to be transformed in each case onto a boundary edge, which lies in a plane in each case, in the unit space. In order to allow simple calculation of distances to the surface of the unit space segment object, the contours are advantageously mapped onto preferably circular boundary edges. In particular, the unit space segment object can then comprise the boundary edges of the transformed contours. The unit space segment object is preferably defined by these boundary edges in this case.

This occurs, for example, if the unit space segment object is bounded at least sectionally by a circumferential surface that is formed by the shortest connections between two boundary edges of the contours. If the contours in the unit space are transformed onto circular boundary edges, the resulting unit space segment object is a cylindrical or oblique cylindrical unit space segment object in the simplest case, or a unit space segment object in the form of a truncated cone (possibly also oblique).

However, all of these unit space segment objects can be described by simple mathematical reproductions. In particular, an exact description of the surface of the unit space segment object can be specified and calculated efficiently by a finite number of computational steps. Calculation of intervals relative to this surface is therefore particularly easy to perform. Other unit space segment objects offering this possibility for surface description can also be generated in the unit space, preferably in addition. For example, a unit space segment object could be described by a sphere or other three-dimensional rotation object, which can likewise be calculated efficiently.

In a development of at least one embodiment of the invention, the planes of the boundary edges in the unit space are so disposed as to be tilted by an angle relative to each other. In particular, this means that sections at branch points of the tubular object can also be expressed easily in the form of a model by way of a single unit space segment object, and therefore the number of unit space segment objects that are required for the model-like description of the tubular object can be limited.

This can preferably result in the boundary edges of two different contours having one or more shared points in the unit space. In particular, the boundary edges can touch and therefore have only one shared point, or the boundary edges of the contours can intersect each other and therefore have at least two shared intersection points. This preferably corresponds to the position of the corresponding contours in the source space. In other words, hardly any restrictions apply to the modeling of branches of the tubular object, and therefore a specific method for the depiction of particularly complicated branches is not required.

As indicated above, it is particularly advantageous if values of the signed distance function represent separations in the unit space from the surface of the unit space segment object. These separation values need not correspond to the separations from the aforementioned 'virtual' (i.e. not necessarily calculated in the source space) segment object in the source space, but it is then possible in each case to ascertain whether a spatial point lies on the surface of the unit space segment object, and hence on the surface of the virtual segment object of the source space, such that it is also possible reliably to distinguish whether a query point is disposed inside or outside the tubular object.

This information can be used to determine a global position indicator function (subsequently referred to simply as 'indicator function'), preferably for a plurality of intersecting or adjoining virtual segment objects of the source space. The global indicator function for a plurality of unit space segment objects, said indicator function being based on the signed distance function of the unit space segment objects, is preferably established by forming extreme values for distances in the unit space. It must be taken into consideration in this case that each unit space segment object is derived from a different transformation function, and therefore each unit space segment object is assigned an individual unit space. In this case, a query point in the source space is transformed into each unit space of the plurality of intersecting or adjoining unit space segment objects. For each of the points that is transformed, starting from the query point, a separation to the respective unit space segment object is determined on the basis of the signed distance function that is assigned to the respective unit space segment object in the respective unit space, and an extremum (preferably the minimum) of these determined separations is then formed. Relative global positional information which forms the value of the global indicator function for the relevant query point is then given by the operational sign of the extremum. It is therefore possible to specify the relative position of a query point in the source space in relation to the combined volume of a plurality of adjoining or overlapping virtual segment objects of the unit space.

As mentioned in the introduction, provision is inventively made for determining a boundary surface network that is based on a multiplicity of items of relative positional information. This can preferably be achieved by means of the global position indicator function described above.

It should be noted at this point that the choice of extremum depends on the way in which the local signed distance function is established in the respective unit space and on the operational sign that is used to express separations from a surface of the respective unit space segment object inwards toward the interior of the unit space segment object or outwards. In particular, each of the local signed functions should describe the position of a query point relative to the respective unit space segment object in the same way. This means that query points lying in the volume of the respective unit space segment object are described by an identical operational sign by each local signed distance function, and are assigned e.g. a negative separation value. In the same way, for all unit space segment objects, separations to query points lying outside the respective unit space segment object can be expressed by a positive operational sign, while query points lying on the respective unit space segment surface are always described by a separation of zero. When establishing all signed distance functions as described here, it is particularly advantageous to determine the extremum by forming a minimum as described above. If the local signed distance functions describe the aforementioned separations in such a way that query points inside the volume of the respective unit space segment object are assigned positive separations and query points outside are assigned negative separations, the extremum can be determined by determining a maximum. This ensures that the position relative to the outermost surface of the combined volume of the overlapping segment objects in the source space is always described by means of the global indicator function.

According to an example development of at least one embodiment of the method for determining a boundary surface network, provision is further made for performing the following steps:

In a step, provision is made for supplying a representation of the tubular object on the basis of the image data, said representation comprising the ordered series of contours. A representation of the tubular object is understood to mean a data record which in some way expresses the geometric structure of the object, and may also relate to specific selected positions or sections only. The aforementioned center line depiction is an example of a representation comprising an ordered series of contours.

In a further step of the method according to at least one embodiment of the invention, provision is made for local measurement information to be supplied for points of the representation. For example, this local measurement information can be provided on the basis of the image data or also on the basis of the representation itself. In particular, it is also possible for points of the representation to be assigned a plurality of local measurement information elements. Moreover, it is also conceivable for the local measurement information be a direct part of the representation. The local measurement information can be e.g. a diameter or a radius at a specific point (i.e. local location) of the hollow organ. The corresponding point of the hollow organ is then assigned to a specific point or object of the representation.

In a subsequent step following thereupon, provision is made for creating an organized breakdown structure depiction of the tubular object, comprising breakdown cells that have different spatial extents based on the local measurement information. In particular, the breakdown structure depiction can be hierarchically organized, i.e. self-referencing, for example, and is most preferably generated recursively. The breakdown structure comprises a division, preferably of the whole source space, into breakdown cells that do not intersect each other, wherein the combination of the breakdown cells depicts the whole of the space of the tubular object that is under observation and is to be reproduced in the context of the method according to the invention. In the recursive formation of the breakdown structure depiction, this applies in particular to breakdown cells that are determined in a final step of the recursive method in each case. The breakdown structure depiction can preferably be an octree.

According to the development of at least one embodiment of the method, provision is lastly made for performing the previously mentioned step of deriving a boundary surface network, now on the basis of the breakdown structure depiction.

Using this development of at least one embodiment of the method, a locally dependent size of the breakdown cells can be established independently of a fixed breakdown structure size, and ultimately dictates the accuracy of the expression of detail of the boundary surface network. According to at least one embodiment of the method, the dimensions of the breakdown cells then correspond to a local sampling rate for sampling the surface of the hollow organ, wherein said sampling rate can be increased or decreased if this is required locally by the structure of the hollow organ. This ensures that at least one embodiment of the method is not too computationally intensive, thereby allowing efficient calculation of the boundary surface network. Moreover, it is thus possible reliably to prevent the occurrence of artifacts due to different sizes of local structures, which could result in problems in branching regions, for example.

BRIEF DESCRIPTION OF THE DRAWINGS

The invention is explained again in greater detail below with reference to example embodiments. Identical components are denoted by identical reference numerals in the various figures, in which:

FIG. 19 shows an example embodiment for a boundary surface network determination system.

DETAILED DESCRIPTION OF THE EXAMPLE EMBODIMENTS

Figure 1:
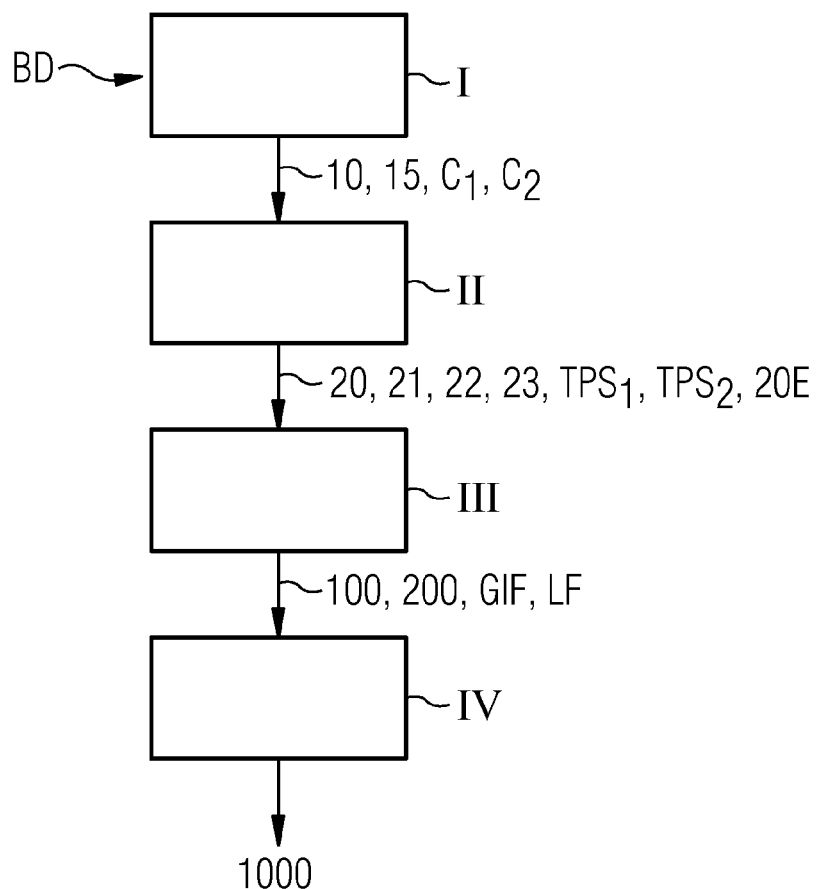
FIG. 1 shows a greatly simplified flow diagram for an example embodiment of the method according to the invention for determining a boundary surface network.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a greatly simplified flow diagram for an example embodiment of a method for determining a boundary surface network of a tubular object, wherein said method can be performed in the inventive manner. In this case, however, the basic approach of the method for determining a boundary surface network using contours from a center line depiction of the tubular object is initially explained below with reference to the FIGS. 1 to 10, wherein use of an embodiment of the invention is not necessary in this context, e.g. when only greatly simplified geometric contours are used to describe the object geometry.

In a first step I of an embodiment of the method, a representation 10 of the tubular object is initially provided. For this purpose, image data BD that was measured using a computer tomography system or generated using a magnetic resonance tomography system is analyzed. This image data BD typically comprises two-dimensional sections through the tubular object. The combination of a plurality of these two-dimensional sections in this case allows conclusions to be made in respect of the three-dimensional shape of the tubular object. In principle, the original image data can be used as a representation 10 of the tubular object. Since the quantities of image data are very large, however, it is usually used to create a representation 10 of the tubular object in the form of a center line depiction. On the basis of the image data BD, a center line is placed in each tube section of the tubular object in this case, and center points are disposed at regular or irregular intervals on the center line.

Figure 11:
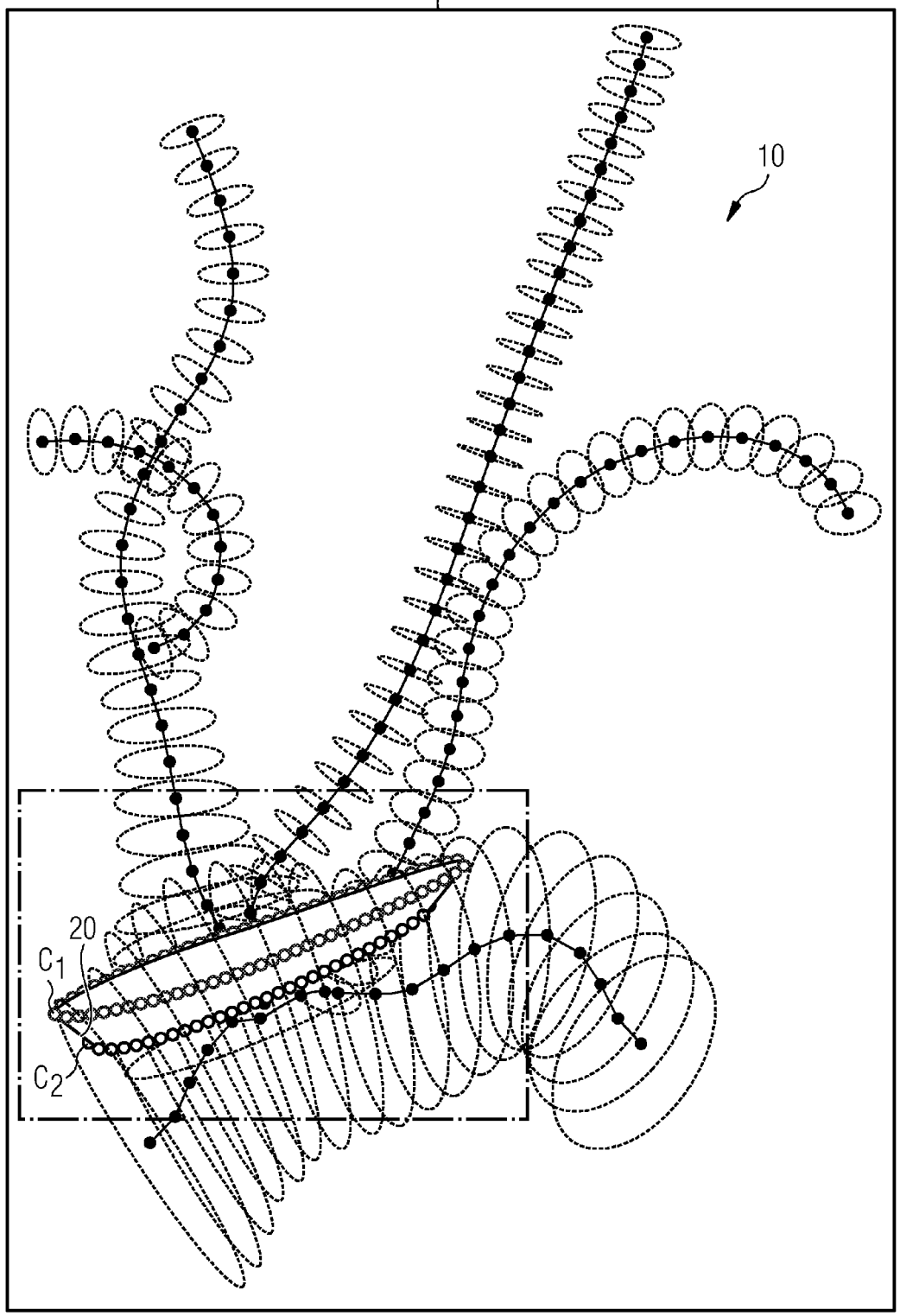
FIG. 11 shows an example embodiment for a center line depiction comprising an ordered series of contours for a section of a bronchial tree, in which two contours are highlighted.

By way of example, FIG. 11 schematically shows an extract from a center line depiction of a bronchial tree. In this case, each of the center points is assigned a contour C1, C2 in a plane that is perpendicular to the center line at the location of the center point (the contours C1, C2 are magnified here for the sole purpose of marking them out from the contours at the other center points), wherein said contour represents the dimensions of the tubular object in this plane. In this case, the contours may be simplified geometric contours C1, C2 such as circles or ellipses which approximate the real contour of the tubular object at the respective center point, or freeform contours C1, C2 as shown in FIG. 11 and as explained below. In other words, the center point depiction here provides an ordered series of contours C1, C2 on the line of center points.

The contour C1, C2 also assigns local measurement information 15 to the center points in each case, said information describing e.g. the interval to the closest surface of the tubular object, i.e. the closest interval to the surface, or simply the radius in the case of a circular contour C1, C2. It is also possible for a plurality of local measurement information elements 15 to be assigned to a center point, such that each center point can be associated with one or possibly more contours of the tubular object. Center points to which a plurality of contours C1, C2 are assigned may be present in the region of branches of the tubular object, for example.

Various methods for creating center line depictions on the basis of image data are known to a person skilled in the art. One such method is explained in the German patent specification DE 10 2009 006 414 B3, for example, the entire contents of which are hereby incorporated herein by reference.

Figure 2:
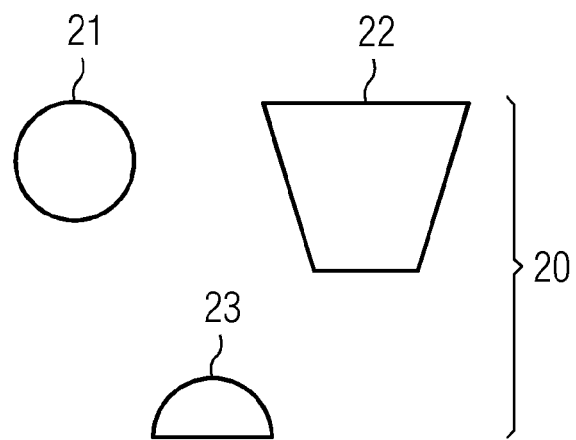
FIG. 2 shows example embodiments of basic geometric bodies for use as graphical primitives.

In a subsequent step II following thereupon, a segment object 20 is then inserted in each case between immediately consecutive center points on this center line. For example, the segment objects 20 can be basic shapes that are geometrically simple to describe (so-called graphical primitives), e.g. a cylinder, a sphere 21, a cone, a truncated cone 22 or even a hemisphere 23, some of which are depicted in FIG. 2.

With regard to the rapid calculation of the boundary surface network of the tubular object, it is particularly beneficial that a closed-form equation for such a simple segment object or a set of simply definable boundary surfaces can be specified in this case, allowing the calculation of the interval from a query point to the surface of the segment object. This is highlighted in FIG. 11 by way of the marked contours C1, C2, which are approximated here by a segment object 20 in the form of a truncated cone.

As explained below, an embodiment of the invention also allows this concept to be transferred to any desired freeform contours. This means that segment objects 20 which are inserted between the center points can also be based on so-called freeform contours in the context of the invention. In this case, the insertion of a segment object between center points can also be realized by determining transformation functions TPS1, TPS2 for the contours C1, C2, such that these can be transformed from the source space (depicted in FIG. 11) into a unit space. On the basis of the transformed contours C1, C2, it is then possible to create a unit space segment object 20E in the unit space, which segment object likewise satisfies the aforementioned requirement for simple calculation of the surface shape. In this case, each unit space segment object 20E, which corresponds to a set of consecutive contours (e.g. two consecutive contours C1, C2 in each case in the FIGS. 13 and 17), is assigned a dedicated transformation function TPS1 or TPS2. In this case, the contours C1, C2 belonging to a unit space segment object 20E are transformed into the unit space using the same transformation function TPS1 or TPS2 in each case. It is thus possible to specify a closed-form equation or a set of simply definable boundary surfaces in the unit space, by which the interval from a query point in the unit space to a surface of the unit space segment object 20E can be calculated.

In a subsequent step III of the example embodiment of the invention as described in FIG. 1, a hierarchically organized breakdown structure depiction 100 of the tubular object can be created on the basis of the segment object 20, 21, 22, 23 (or on the basis of the unit space segment object 20E in conjunction with the transformation functions TPS1, TPS2).

In the preferred example embodiments shown here, the breakdown structure depiction 100 is an octree 100 with cubic breakdown cells 200. However, the invention is not limited to this.

Other breakdown structure depictions 100 are likewise conceivable. For example, a quadtree or a combination of quadtrees is also possible. The shape of the breakdown cells 200 can likewise vary. For example, a pentagonal base surface can also be provided for the breakdown cells.

The octree 100 forms a complete depiction of the source space, i.e. in particular a space that is described using so-called world coordinates in the example embodiment. These world coordinates represent a system of coordinates that is independent of the observed object, and are usually established with reference to the measurement space of the imaging system in use, i.e. the origin of the world coordinates system lies e.g. in the center of the imaging system and the coordinate axes can be correlated to the characteristic device axes.

It is likewise conceivable for the source space to refer to a system of coordinates that is assigned to the image data BD, wherein the source coordinates of the source space lie in one of the corners of an image, for example.

Figure 5:
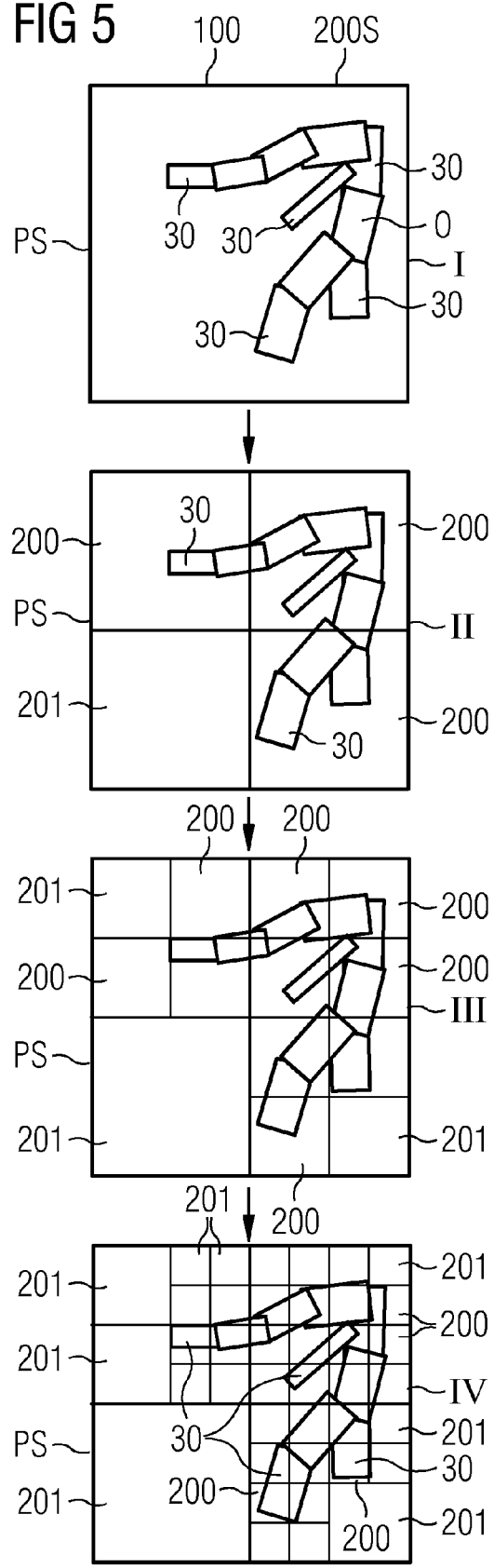
FIG. 5 shows a depiction of various possible intermediate steps for an example embodiment of a derivation of a breakdown structure depiction.

An example of the creation of an octree 100 is shown in FIG. 5, which is explained later in the text.

In this case, the cubic breakdown cells 200 of the octree 100 differ in their spatial extent. In the example embodiment, these different extents are determined on the basis of the local measurement information 15 as explained in detail later in the text.

In particular, a local signed distance function for each of the segment objects 20 or unit space segment objects 20E is determined in this example embodiment. This local signed distance function LF describes the interval for a query point to a surface of the segment object or to the surface of the unit space segment object 20E in each case.

Figure 18:
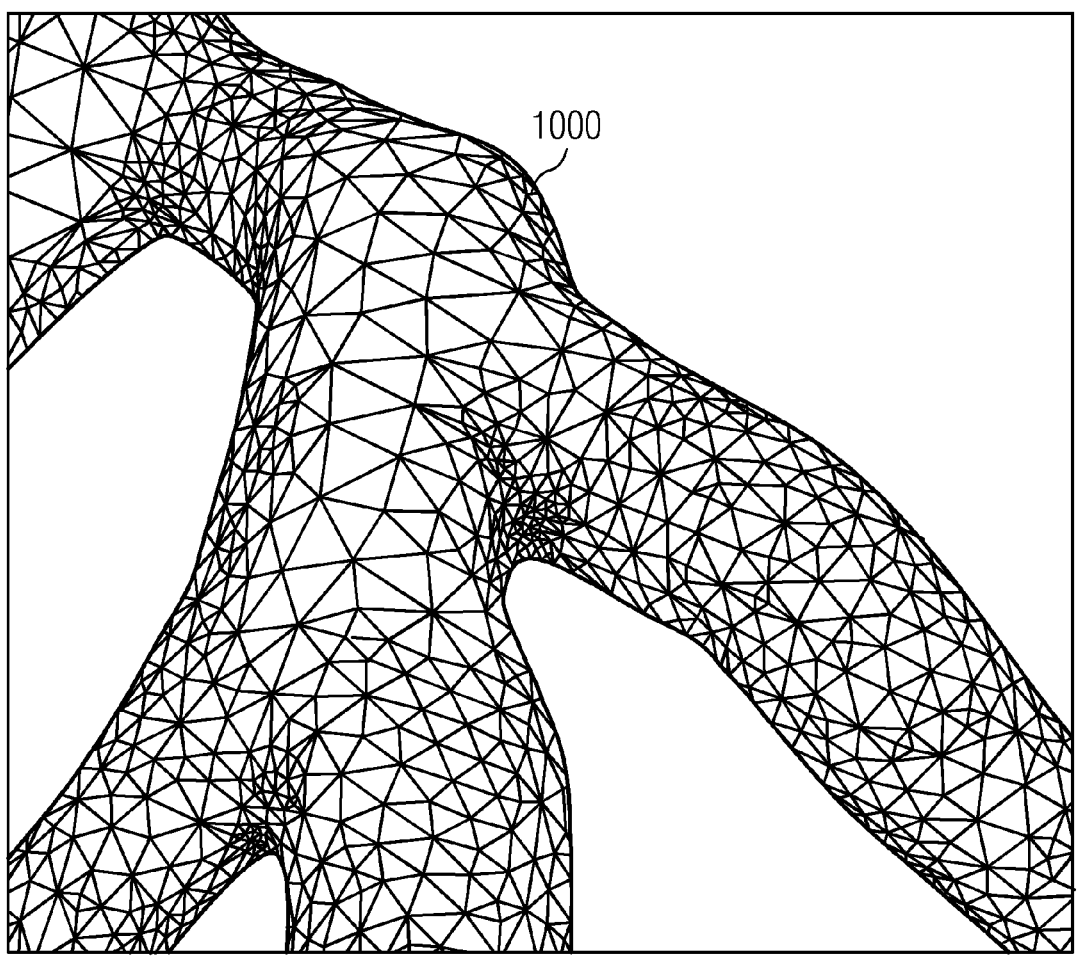
FIG. 18 shows a depiction of a possible boundary surface network for a section of a vascular tree.

In a further step IV, the boundary surface network 1000 of the tubular object is derived on the basis of the octree and—at least indirectly—on the basis of the local signed distance function LF. Such a boundary surface network 1000 is shown in FIG. 18 for a section of a vascular tree by way of example.

As described in greater detail later in the text, intersection points of a plurality of segment objects 20 are approximated by means of a global signed distance function GF or a global indicator function GIF. In this case, the global indicator function GIF or the global signed distance function GF is always based on the local signed distance function for the segment objects that have been determined, irrespective of whether an object was determined in world coordinates or in a unit space.

Figure 3:
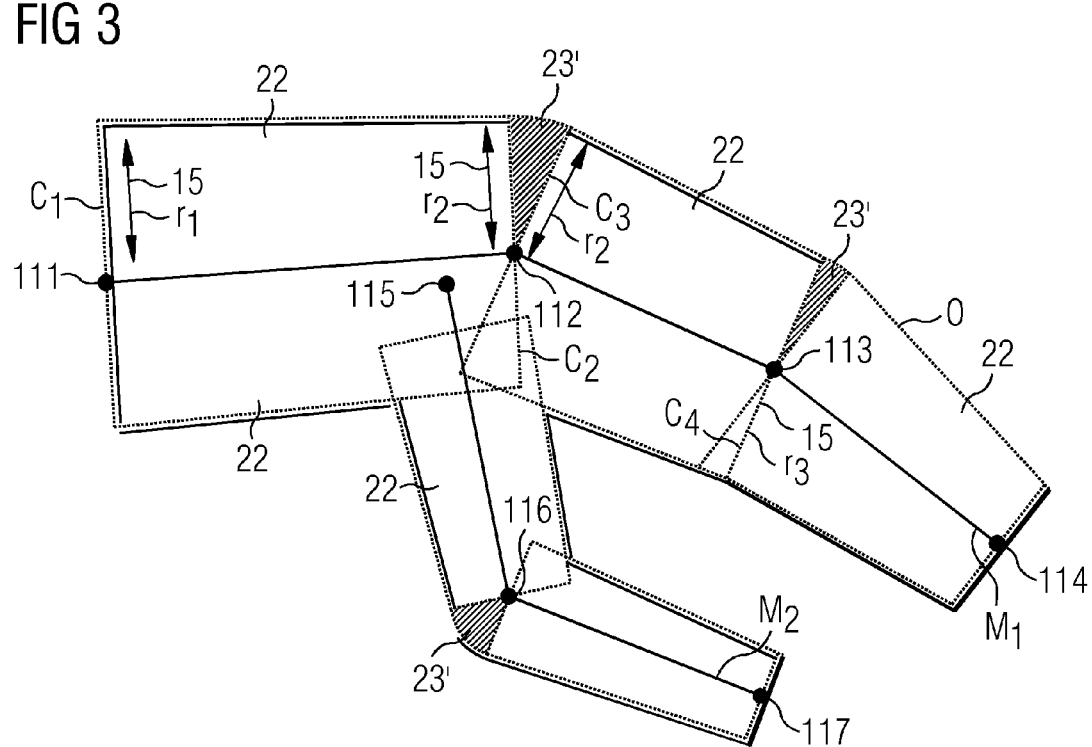
FIG. 3 shows an example embodiment of the adaptation of basic geometric bodies to a center line depiction.

FIG. 3 shows an example embodiment of a representation 10 of a very simple tubular object O in detail. The representation 10 is a center line depiction 10 in this case. In order to express the tubular object O topographically, a plurality of discrete center lines, in particular a first center line M1 and a further center line M2, are used in this example embodiment due to a branch. Alternatively, the branch can also be depicted by converging center lines, such that a single branching center line appears to represent the tubular object O topologically in the manner of a tree structure.

The depicted center lines M1, M2 extend in a straight line within each section between center points 111, 112, . . . , 117 that are disposed irregularly on the respective center lines M1, M2, each of the center points 111, . . . , 117 being assigned at least one local measurement information element and/or contour C1, C2, C3, C4 as described above. At the same time, the local measurement information specifies the radial extent of a plurality of segment objects 20 which are in each case inserted between two immediately consecutive center points 111, . . . , 117 on one of the center lines M1, M2. These segment objects 20 express the surface shape for each segment of the tubular object O in the form of a model. In particular, a model-based description has the advantage that the complexity of the description of the surfaces of the tubular object can be restricted, thereby allowing rapid calculation of the boundary surface network.

In particular, the calculation is optimized by selecting the segment objects 20 as described in conjunction with FIG. 2 from a group of graphical primitives. A plurality of topologically different segment objects 20 between two consecutive center points 111, 112, 113, 114, 116, 117 are adapted to the center line depiction 10 in FIG. 3, in order thereby advantageously to achieve an approximation and model-based description of the surface shape of the tubular object O.

In this case, a first center point 111 that is disposed on the center line M1 is assigned a first radius r1 as local measurement information 15. The first radius r1 is determined by the center line depiction in this case. Similarly, it is also conceivable for the measurement information 15 to be taken directly from the image data BD that forms the basis of the center line depiction 10. This first radius r1 establishes a contour C1 of the base surface of a first truncated cone 22 here, said contour C1 being assigned to the first center point 111. This contour C1 lies in a plane that is perpendicular relative to a center line section to an adjacent further center point 112. The circumferential surface or associated length of the truncated cone is determined by the interval from the first center point 111 to the further center point 112. A local measurement information element 15, which is assigned to this center point 112 and comprises a second radius r2, establishes the radial extent of the top surface of the truncated cone 22 in this case. At the same time, this measurement information specifies a second contour C2, which is associated with the further center point 112 and assigned to the top surface. The center line depiction provides center lines M1, M2 featuring an ordered series of contours C1, C2 at their center points 111, 112, 113, 114 and associated measurement information elements.

Attached to the top surface of the truncated cone 22 is a segment 23' of a hemisphere having a radius that likewise corresponds to the second radius r2. This hemispherical segment 23' closes a gap which would otherwise continue to a further truncated cone 22 after the hemispherical segment 23'. This next truncated cone 22 is disposed between the further center point 112 and a subsequent center point 113 of the center line M1. The second and third radii r2, r3 assigned to these center points 112, 113 and the interval of the center points 112, 113 specify a base surface, circumferential surface and top surface of the next truncated cone 22 as described in respect of the first truncated cone 22. The base surface and top surface of this truncated cone also establish the further contours C3 and C4.

As shown by the example embodiment in FIG. 3, the number of segment objects that is required to model the tubular object O and reproduce the surface shape with a given degree of accuracy can be drastically reduced by means of two topologically different segment objects 20, such as a truncated cone 22 and a hemispherical segment 23', whereby the calculation speed of the boundary surface network can again be optimized.

In the region where the object O branches, a further center line M2 starts in the vicinity of the main center line M1, such that the center point 115 which forms a start point of the further center line M2 lies inside a first truncated cone 22 that is adapted to the first center line M1. The branching further center line M2 therefore touches or intersects a segment object 20 that is assigned to the first center line M1. Local measurement information elements 15, in particular radii, are assigned to each of the center points 115, 116, 117 of the further center line M2, such that the surface of the tubular object O is again approximated by a sequence of truncated cones 22 and hemispherical segments 23' on the basis of the center line M2 and the measurement information elements 15.

It is also evident from FIG. 3 that the surface of the tubular object O, in the region of the intersection in particular, cannot easily be modeled by the combination of the surfaces of the segment objects 20. For example, a truncated cone 22 assigned to the second center line M2 would project into a plurality of segment objects 20 of the first center line M1.

In order to avoid this, while nonetheless preserving or even increasing the advantage of rapid calculation of a model-based description of the surface, the segment objects 20 that are determined on the basis of the local measurement information 15 are used to generate an octree in the context of embodiments of the invention.

As explained above, the octree depicts a recursively generated hierarchical reproduction of the source space PS to which the representation 10 of the tubular object O relates.

During the creation of an octree, the source space containing the observed object O is recursively divided into breakdown cells, i.e. breakdown cuboids or cubes, in such a way that their combination expresses the whole of the observed source space. As explained above, the recursive division can take place on the basis of the segment objects 20 that are adapted to the center line depiction 10 in this case, and therefore on the basis of the local measurement information 15 in particular. According to the invention, the cubic breakdown cuboids that have been determined therefore have different spatial extents depending on the local measurement information 15. In addition to its assignment to segment objects, however, the local measurement information 15 can be used in many different ways to establish the spatial extent of the breakdown cuboids in this case.

In this context, each segment object 20 can be assigned in particular a so-called 'bounding box', i.e. a boundary cuboid 30 which completely encloses the respective segment object 20. It is particularly advantageous if the boundary cuboid encloses the respective segment object 20 as closely as spatially possible, as shown by way of example in FIG. 4 for a composite segment object 20* comprising a truncated cone 22 and two hemispheres attached thereto. The boundary cuboid 30 corresponds to the smallest possible cuboid that can enclose the segment object 20*. As described above in accordance with FIG. 3, the truncated cone 22 in this case is adapted to the center line depiction 10 on the basis of the first radius r1 and the second radius r2 and on the basis of the center line M1 with the center points 111, 112. The spatial dimensions of the boundary cuboid 30 describe an upper limit of the extent of the segment object 20*, such that the dimensions of the boundary cuboid 30 can be used to establish the spatial extent of the breakdown cuboids as described below.

Figure 4:
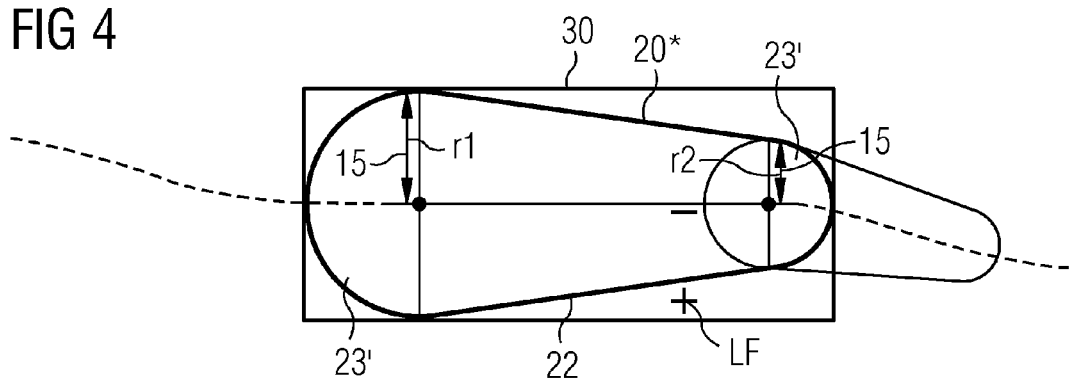
FIG. 4 shows an example embodiment of the establishment of a boundary cuboid.

A further information element that can be advantageous for establishing the spatial extent of the breakdown cuboids is the local signed distance function LF, which was explained above in connection with FIG. 1. This is again established inside the spatial region of the boundary cuboid 30 for a segment object 20 that is registered therein, and describes the interval from any chosen query point in the boundary cuboid 30 to the closest surface of the respective segment object relative to the query point. As indicated in FIG. 4, the local signed distance function LF is so defined in the example embodiment as to assign positive interval values to query points that lie outside the volume of the segment object 20*, while query points lying inside the volume of the segment object 20* are assigned negative interval values. Correspondingly, query points that lie on the surface of the truncated cone 22 have a function value of zero for the local signed distance function LF. In addition to indicating a monotonic spread of the interval value by means of the operational sign of the resulting function value for a query point, the local signed distance function LF therefore also provides relative positional information for this query point in relation to the surface of the segment object 20*, and hence the position of the query point in relation to the surface of the tubular object. In order to optimize the calculation time of the local signed distance function, query points that lie outside the boundary cuboid 30 of the segment object 20* are not assigned a function value, since these points are irrelevant for the derivation of the boundary surface network of the tubular object in the further method.

As a result of the advantageously 'simple' geometric surface shape of the segment objects 20, which can be described by means of a closed function or a set of simply definable boundary surfaces as explained above, it is likewise possible to define the local signed distance function LF on the basis of the closed function or the set of simple boundary surfaces. The preferred analytic calculation of the local signed distance function LF therefore requires only a small amount of time, thereby allowing particularly rapid determination of the boundary surface network.

As described above, the local signed distance function LF is therefore based on the respective segment object 20*, i.e. in particular on the local measurement information element or elements 15 assigned to the segment object 20*. The local signed distance function LF helps to establish the extent of the octree as explained in greater detail later in the text, and therefore said extent is likewise ultimately based on the local measurement information. Moreover, the described example embodiment also allows the use of further criteria for establishing the extent of the breakdown cuboids 200, in order to ensure that determination of the boundary surface network is as precise as possible but nonetheless rapid. In particular, the following specifically shows the local signed distance function being taken into consideration when establishing the spatial extent of the breakdown cells 200 of an octree. For this purpose, FIG. 5 shows a division of the source space PS into breakdown cells 200, initially on the basis of the dimensions of the respective boundary cuboids 30 of the segment objects that have been adapted to the center line depiction.

A start breakdown cell 200S, which encompasses the entire source space PS containing the tubular object O that is to be modeled, is recursively divided into a plurality of breakdown cuboids 200, these being depicted here merely in a two-dimensional view for the sake of clarity. Also shown in the source space PS and corresponding to the center line depiction of the tubular object O are boundary cuboids 30, these being established as described above and forming in each case a minimal cuboid envelope of segment objects that model the tubular object O in the source space PS.

In a first breakdown step TI, the start breakdown cell 200S is initially divided into eight breakdown cuboids 200 having identical dimensions, in order to obtain the 'octree depiction' 100 of the source space PS. Only four of the breakdown cuboids 200 are visible in the view depicted in FIG. 5, and are also referred to subsequently as 'octree cells' for the octree. In this case, one of the octree cells 200 is empty of boundary cuboids 30, meaning that it does not contain any spatial region of the tubular object O, and is therefore 'object-free' while the other octree cells 200 are 'object-occupied'.

In a second breakdown step TII following thereupon, all of the object-occupied octree cells 200 that are superimposed by a boundary cuboid 30 are again divided into octree cells 200 having identical dimensions in each case. The object-free octree cell 200 is not divided further, however, and therefore the final dimensions are achieved for this octree cell. Breakdown cuboids that have achieved their final dimensions in the hierarchically structured breakdown structure depiction 100 are subsequently referred to as so-called 'leaves' and correspondingly as so-called 'octree leaves' 201 for the octree 100.

In the example embodiment shown in FIG. 5, the above described procedure is repeated recursively in two further breakdown steps TIII, TIV. As part of the recursive repetition, further spatial regions that are object-free (and therefore constitute octree leaves 201) are determined on the basis of the criterion of the superimposition of octree cells 200 by boundary cuboids 30.

In order to achieve the best possible approximation of the topology and the dimensions of the tubular object O, the division of the octree 100 is nonetheless effected on the basis of further criteria which establish the size of the octree leaves 201. In particular, a local breakdown limit value Rth which establishes the spatial extent of the octree leaves 201 is specified on the basis of the local measurement information 15 for this purpose.

As explained above in connection with FIG. 4, for example, each segment object 20 is assigned at least one local measurement information element 15, which can be derived from the first radius r1 and/or the second radius r2 for truncated cones 22, for example. In order to ensure that the segment object 20 locally has at least the dimensions of the smaller of the two radii r1 and r2, the local breakdown limit value Rth is advantageously determined by the smaller of the two radii r1, r2 and therefore corresponds in this case to an extremum, specifically the minimum of the local measurement information 15.

Figure 6:
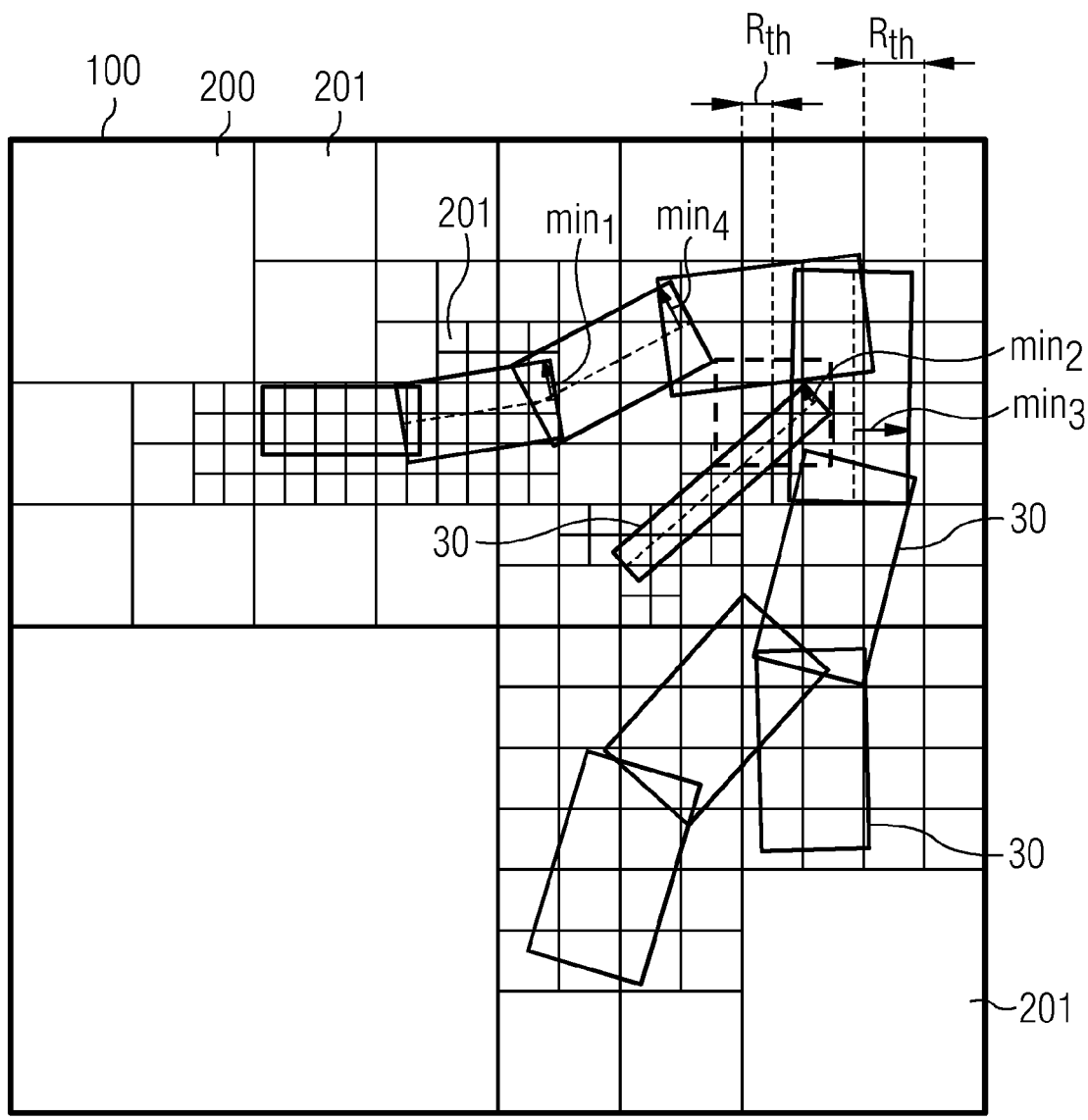
FIG. 6 shows a detailed depiction of a step from FIG. 5.

This is further clarified by way of example in FIG. 6 for a plurality of boundary cuboids 30 to which segment objects are assigned, wherein for the sake of clarity said segment objects are not depicted. A plurality of minima min1, min2, . . . , min4 (i.e. extrema of the local measurement information 15 assigned to the boundary cuboids 30) are compared for this purpose. As shown in FIG. 6, one of the octree cells 200 is superimposed by a boundary cuboid 30 to which a first minimum min1 is assigned. In addition to this, the same breakdown cell 200 is likewise superimposed by a boundary cuboid 30 to which a second minimum min4 of the local measurement information is assigned (the second minimum being marked correctly for the relevant boundary cuboid 30 but at some distance from the relevant octree cell 200 for the sake of clarity). The first dimension min1 is smaller than the second dimension min4 in this case. This octree cell 200 is now recursively subdivided into a plurality of smaller octree cells 200 having identical dimensions until such time as a local breakdown limit value Rth based on the minimum from the two minima min1, min4 is passed. The local breakdown limit value Rth can therefore also be established on the basis of an extremum from a plurality of local measurement information elements 15 relating to a plurality of segment objects 20 and/or a plurality of boundary cuboids 30. Only boundary cuboids 30 or segment objects 20 that superimpose the octree cell 200 are taken into consideration in this case. The local breakdown limit value Rth is therefore determined on the basis of all locally relevant segment objects 20. The corresponding minimum is therefore a so-called 'locally relevant minimum' or 'locally relevant extremum'. Accordingly, the local breakdown limit value Rth is an estimate of the locally relevant smallest structure of the tubular object O in the region of the respective breakdown cell 200.

Figure 7:
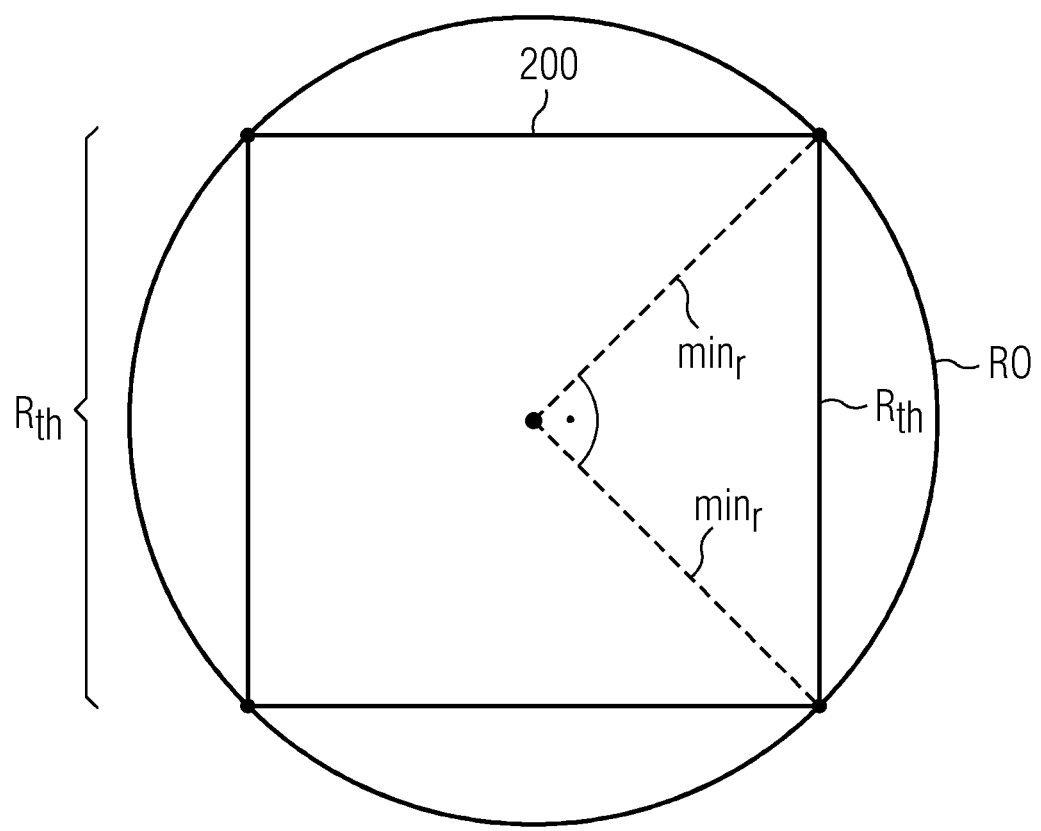
FIG. 7 shows an example embodiment for the adaptation of a reference object to a breakdown cell.

An embodiment of the invention is further developed on the basis of this idea as illustrated in FIG. 7. The local breakdown limit value Rth should preferably be no greater than the dimension of the locally relevant smallest structure of the tubular object in each case, and the estimate of the local breakdown cell limit value Rth should be 'conservative', i.e. cautious or minimal to the extent that a segment object which is established on the basis of local measurement information might only superimpose the breakdown cell 200 in parts, i.e. the octree cell 200 should be smaller than the segment object. This is advantageous in particular because, as described below, the boundary surface network can be determined particularly rapidly on the basis of the information describing the superimposition of the breakdown cells by segment objects or boundary cuboids.

In order to obtain this conservative estimate, the local breakdown limit value Rth can be specified such that when used to create a smallest breakdown cell 200 at a location (i.e. an octree leaf), the smallest breakdown cell 200 could be inserted completely into a local reference object RO situated at this location. The local reference object RO is again preferably an object whose surface or shape can be described by a closed function or a set of simply definable boundary surfaces, i.e. can be described simply. In the example embodiment featuring cubic octree cells 200, the reference object RO is a sphere. Alternatively, other reference objects RO can also be selected depending on the basic shape of the breakdown cell 200. If the breakdown cell 200 is cuboid, for example, it may be suitable to use an ellipsoid of revolution, cylinder, etc. to provide an estimate for rapidly determining whether the dimensions of the breakdown cell 200 are smaller than an overlapping segment object.

The spherical reference object RO is defined on the basis of the local measurement information or the locally relevant minimum minr in such a way that it can be inserted into the tubular object O or into the local segment object 20 in the region of the breakdown cell 200. In this case, the sphere therefore corresponds to the largest object that could be inserted into the segment object 20 or into the tubular object in the region of the breakdown cell 200, and therefore establishes an upper limit for the local breakdown limit value Rth. An upper limit value for the local breakdown limit value Rth can therefore be estimated as follows in this example embodiment:

$$R_{th} < \min_r \cdot \frac{\sqrt{3}}{2}.$$

It is emphasized at this point that the locally relevant minimum minr is merely an example of local measurement information 15. It is also possible to establish the upper limit value for other segment objects using other local measurement information elements by means of the calculation described above.

In the example embodiment, a further subdivision is performed recursively for all object-occupied octree cells 200 until the side length of the octree cells 200 is equal to or less than the local breakdown limit value Rth established thus. This guarantees that the dimensions of the octree leaves 201 are always smaller than the dimensions of locally relevant structures of the tubular object O. This establishment of the local breakdown limit value Rth therefore also guarantees that every segment object intersects the boundary surface of an octree leaf 201 in at least one place. As explained in the following, this means that at least one representation in the boundary surface network 1000 is generated for each segment object 20. Establishing the dimensions of the octree leaves 201 in this way can therefore be considered 'topologically reliable'.

Taking this topologically reliable establishment of the local breakdown limit value Rth as a starting point, the depiction of the boundary surface network can be improved even further. If segment objects are separated by less than the local breakdown limit value Rth, for example, it is possible that actually separate segment objects may nonetheless merge when the boundary surface network is generated.

In order to improve this, the local breakdown limit value Rth, which is determined on the basis of the local measurement information as described above, can be established by means of a shared scaling factor. The scaling factor is subsequently designated 'quality factor' or abbreviated to QF and scales all local breakdown limit values Rth of the octree by a shared factor, such that the local breakdown limit value Rth is scaled as follows while nonetheless being established individually for each octree cell 201:

$$R_{th} < \frac{1}{QF} \cdot \min_r \cdot \frac{\sqrt{3}}{2}.$$

The 'quality factor' can be configured as required as a 'quality parameter'.

For values QF<1, the topologically reliable generation of the octree is no longer achieved. If this is not required, however, a further speed advantage can be achieved thereby in the calculation of the boundary surface network.

For values QF<=1, the local breakdown cell limit value Rth is further reduced by a shared factor for all octree leaves, such that although rather more time is required for the calculation, the quality of the detailed depiction can be further improved.

Establishing the octree using a quality factor QF>=1 in particular provides, in addition to a topologically reliable depiction, the additional advantage that the relevant spatial region for depicting the boundary surface network is significantly restricted. Furthermore, this restriction can take place without the need for prior evaluation of the local signed distance function LF described above, or of any other implicit description of the surface of the tubular object.

If a plurality of segment objects have an intersection region that includes a shared octree leaf, this could result in the octree being broken down many times unnecessarily into octree cells which lie entirely within a volume that is enclosed by the tubular object. In order to avoid this, a further improvement can be achieved by means of a criterion for establishing the dimensions of the octree leaves, which ensures that the octree leaves always have at least one region of overlap with the surface of the tubular object.

As indicated above, a criterion for establishing the local breakdown limit value Rth can also be provided by the local signed distance function LF. In order to take intersections of segment objects into consideration in the local breakdown limit value Rth, the local signed distance functions can therefore be used (particularly in the case of a plurality of overlapping segment objects) to establish a global signed distance function GF, which is preferably defined inside the minimal boundary cuboid of the overlapping segment objects, said minimal boundary cuboid being established as described above.

Figure 8:
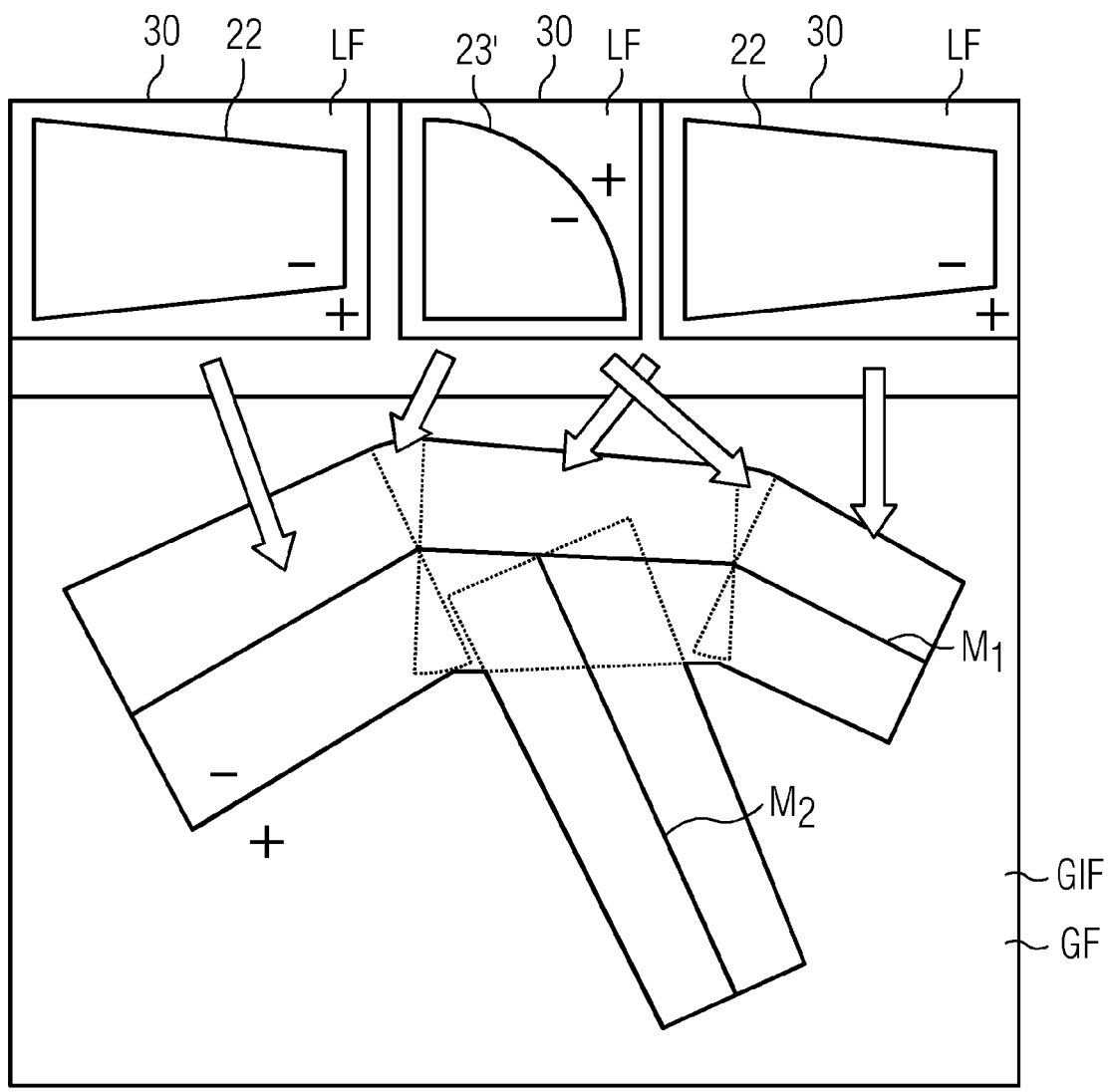
FIG. 8 shows an example embodiment for the specification of a global signed distance function.

FIG. 8 shows a determination of the global signed distance function in greater detail.

In the example embodiment, a plurality of segment objects comprising sphere segments 23' and truncated cones 22 again overlap and simulate a section of a tubular object. Each of the segment objects, the truncated cones 22 and the sphere segments 23', is assigned a local signed distance function LF in an assigned boundary cuboid 30 in each case, wherein said distance function LF also provides relative positional information via the operational sign of its function value, thereby indicating whether a query point is situated inside or outside the segment object concerned. Query points giving a negative function value of the local signed distance function LF lie inside the segment object, query points that are assigned a positive function value lie outside the segment object, and query points having a function value of zero lie on the surface of the respective segment object.

A global signed distance function GF, which is formed for each query point of a breakdown cell by the minimal value of the local signed distance functions LF of the segment objects that overlap this breakdown cell, likewise accurately expresses this positional information. All of the points lying inside the combined volume of the segment objects are described by a negative function value of the global signed function GF, all of the points lying outside the combined volume of the segment objects are described by a positive function value of the global signed function GF, and all of the points lying on the surface of the combined volume of the overlapping segment objects 20 are assigned a function value of zero for the global signed distance function GF. In addition to the separation of a query point from the surface of the combined volume, the global signed distance function GF therefore also expresses relative positional information regarding the combined volume of a plurality of segment objects. As well as expressing the relative positional information, this therefore also carries out the function of a so-called 'global indicator function' GIF for the combined volume of the overlapping segment objects. At the same time, the surface of the combined volume of the segment objects can be specified exactly.

It should be noted at this point that the global signed distance function GF thus defined does not perform any interpolation over the surfaces of a plurality of segment objects. Therefore the global signed distance function GF can also describe sharp edges of segment objects, or of the surface of the combined volume of a plurality of segment objects.

It should also be noted that the local signed distance function LF can also be defined in such a way that query points lying outside a segment object are expressed by negative function values, and query points lying inside the segment object are expressed by positive function values. In contrast with the example embodiment depicted above, in this case the global signed distance function GF for a query point would have to be formed from the maximum of the function values of the local signed distance functions LF for the respective query point accordingly.

Figure 9:
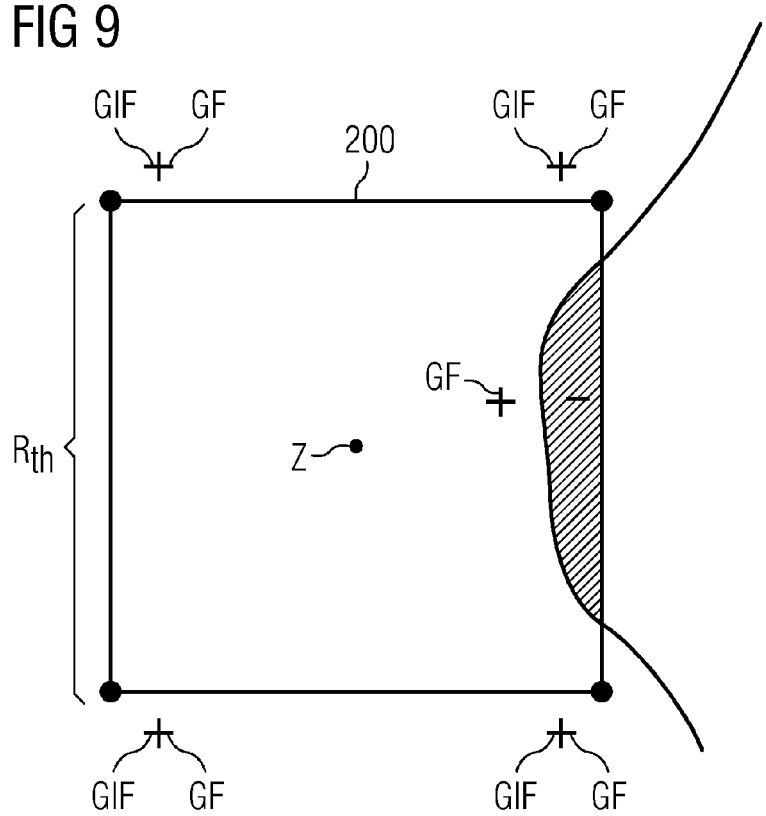
FIG. 9 shows an example embodiment for the specification of a termination criterion for the breakdown of a breakdown cell.

FIG. 9 illustrates the use of the global signed distance function GF or global indicator function GIF for the purpose of establishing the dimensions of a breakdown cell.

The global signed distance function GF or relative positional information is evaluated by the global indicator function GIF at each of the vertices of the breakdown cell 200. If different operational signs are present at the vertices, it is unambiguously clear that the boundary of the breakdown cell intersects the surface of the tubular object or of the combined volume of a plurality of segment objects. As long as this condition is satisfied, further subdivision of the breakdown cells 200 can therefore take place until the edge length of the breakdown cells 200 finally reaches the local breakdown limit value Rth. If different operational signs are still present at the vertices of this octree cell 200, which has an edge length that corresponds to the local breakdown limit value Rth, an octree cell 200 has been specified which intersects the surface of the tubular object and need not be broken down further, i.e. represents an octree leaf. It is therefore possible by means of the local signed function to ascertain that a recursive breakdown is still appropriate, and specifically until such time as the local breakdown limit value Rth is reached.

Alternatively, it is also possible for the global signed distance function GF or relative positional information to be evaluated by way of the global indicator function GIF only when the dimensions of the octree cell 200 have reached or passed below the local breakdown limit value Rth.

A difference in the operational sign of the global signed distance function GF or of the global indicator function GIF for one of the vertices relative to other vertices of the octree cell essentially represents an unambiguous criterion in either of the two approaches, indicating that this octree cell contributes to the description of the surface of the tubular object and therefore must be taken into consideration when generating the boundary surface network.

The case depicted in FIG. 9 shows however that in the reverse case, when there is no alternation of operational signs (as depicted here), it cannot be definitively ruled out that the surface of the tubular object does not pass through the breakdown cell. FIG. 9 specifically shows a case in which the octree cell has already been broken down as far as the breakdown limit value Rth, i.e. no further subdivision would now take place if this were the only termination criterion to be verified. Even if termination of the breakdown were additionally conditional upon a check that all vertices of the breakdown cells have an identical operational sign for the global indicator function GIF, a surface of the object projecting into the breakdown cell on one side only would not be taken into consideration when creating the boundary surface network.

In the example embodiment, therefore, in order to determine more efficiently whether further breakdown of the octree cell 200 as far as the local breakdown limit value Rth is appropriate, provision is additionally made for determining the global signed distance function GF assigned to the breakdown cell 200 for a query point in the center Z of the breakdown cell 200.

In this case, the center Z of the breakdown cell 200 is established by the shared intersection point of the mid-perpendiculars of the boundary surfaces of the breakdown cell 200. The center Z corresponds to a geometric center point of the breakdown cell 200 in this case. This means of establishing the center Z can be used not only for octree cells 200 as in this case, but also similarly for other topologies of breakdown cells 200.

On the basis of the function value of the global signed distance function GF for the central query point in the center Z, a comparison is made between the separation of the central query point Z from the surface of the tubular object and the dimensions of the breakdown cell 200. If the separation of the query point does not reach a size criterion that is assigned to the dimensions of the relevant breakdown cell 200, this breakdown cell 200 is very likely to contain a region of overlap with the surface of the tubular object. In this case, a further breakdown of the breakdown cell 200 takes place. In a variant of the method, the further breakdown is therefore only actually terminated if the verification of this criterion also reveals that the surface does not project into the current octree cell.

The edge length of the cubic breakdown cells is exactly Rth in the case depicted here. The size criterion that is used for this comparison is given by the value $$\frac{\sqrt{3}}{2} \cdot R_{th}$$

for the cubic breakdown cells of the example embodiment, wherein if the check takes place before the local breakdown limit value is reached, the edge length of the breakdown cell at the time of the check can also be used in the size criterion instead of Rth. In this case, a further breakdown is performed if the function value of the global signed distance function GF for a query point in the center Z of the breakdown cell does not reach this size criterion, i.e.

$$GF(Z) < \frac{\sqrt{3}}{2} \cdot R_{th}.$$

In the example embodiment depicted here, the size criterion is therefore specified by the (greatest) separation of the central query point relative to one of the vertices of the breakdown cell, and corresponds here to half of the space diagonal of the cubic octree cell 200.

It is therefore possible to create a locally adaptive breakdown cell structure by means of the described method, wherein the dimensions or size of the breakdown cells is established locally in various ways on the basis of a plurality of criteria in each case. In particular, local measurement information is used as a basis for creating a breakdown structure which ensures that each octree leaf having dimensions that are based on a predetermined local breakdown limit value Rth features at least one point of intersection with the surface of the tubular segment object. It is moreover possible by means of the global indicator function GIF or the global signed distance function GF to calculate precisely the surface of the tubular object for each of the breakdown cells 200.

Figure 10:
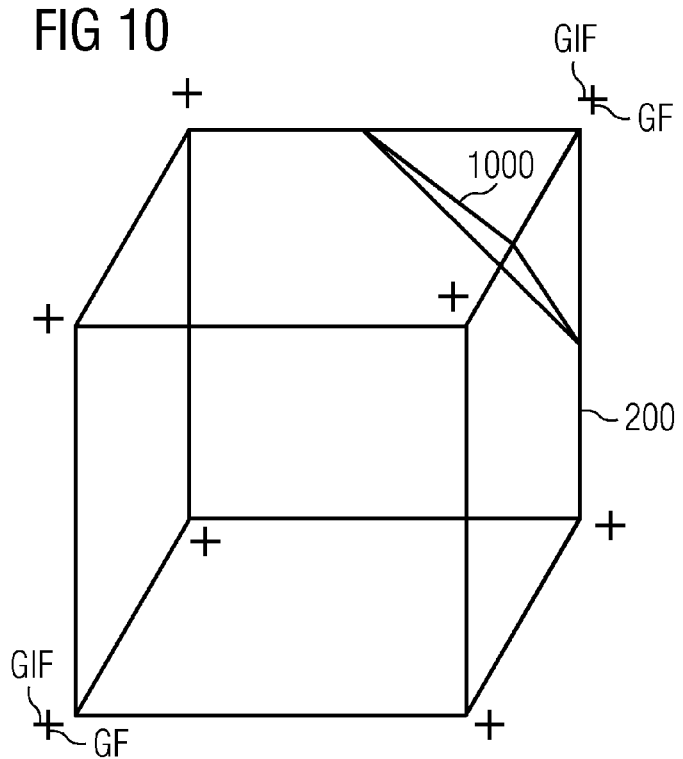
FIG. 10 shows an example embodiment for the specification of a mesh of a boundary surface network based on a global indicator function in the context of a 'marching cubes' method.

FIG. 10 shows the calculation of a section of the boundary surface network 1000 on the basis of a breakdown cell 200 of the breakdown structure depiction. The global indicator function GIF or the global signed function GF is used to determine an interval or at least an operational sign for the octree vertices, i.e. the corners of the octree cell 200, indicating whether the relevant octree vertex is situated inside or outside or on the surface of the tubular object. On the basis of this information, e.g. the known 'marching cubes' method can be used to describe surface sections of the tubular object in the form of a network and to derive a boundary surface network. By means of triangles which are inserted into the breakdown cell 200, the surface of the tubular object is then simulated in the spatial region assigned to the respective breakdown cell 200.

In the example shown in FIG. 10, the global signed distance function GF has a negative function value at one of the upper right-hand corners of the octree cell. It is therefore clear that this vertex lies inside the tubular object.

The function value of the global signed function GF is positive in each case at the other corners of the octree cell. These vertices therefore lie outside the tubular object. A triangular surface is inserted into the octree cell 200 on the basis of this information, wherein said triangular surface correspondingly takes into consideration the relative positional information that is provided by the respective operational signs of the global signed distance function GF. Since the size of the octree cell 200 is already very well adapted in relation to the locally relevant dimensions of the tubular object, an excellent representation of the tubular segment object is therefore provided by the resulting triangular network.

According to the method as per the above described example embodiments for generating a boundary surface network 1000, the segment objects 20 are selected from a group of primitives in each case, in order that the surface of the segment object can be described mathematically in a simple manner.

However, as briefly mentioned above, this concept can also be transferred by way of embodiments of the invention to sections of the tubular object that have complicated shapes, said sections having cross-sectional contours that are advantageously described by planar freeform contours that are not self-intersecting.

FIG. 11 shows an extract from a center line depiction 10 of an aorta curve and branching arteries. As mentioned above, the center line depiction 10 comprises an ordered series of contours C1, C2 at the center points that are disposed on a center line through the respective branch of the arterial vascular system in the source space PS (in the world coordinates system). Each of the contours C1, C2 is associated with one or more local measurement information elements in this case. Two freeform contours C1, C2 are highlighted by way of example in a dash-dot marked extract, and could be approximated as per the method described above by a segment object 20 having the form of a truncated cone.

Figure 12:
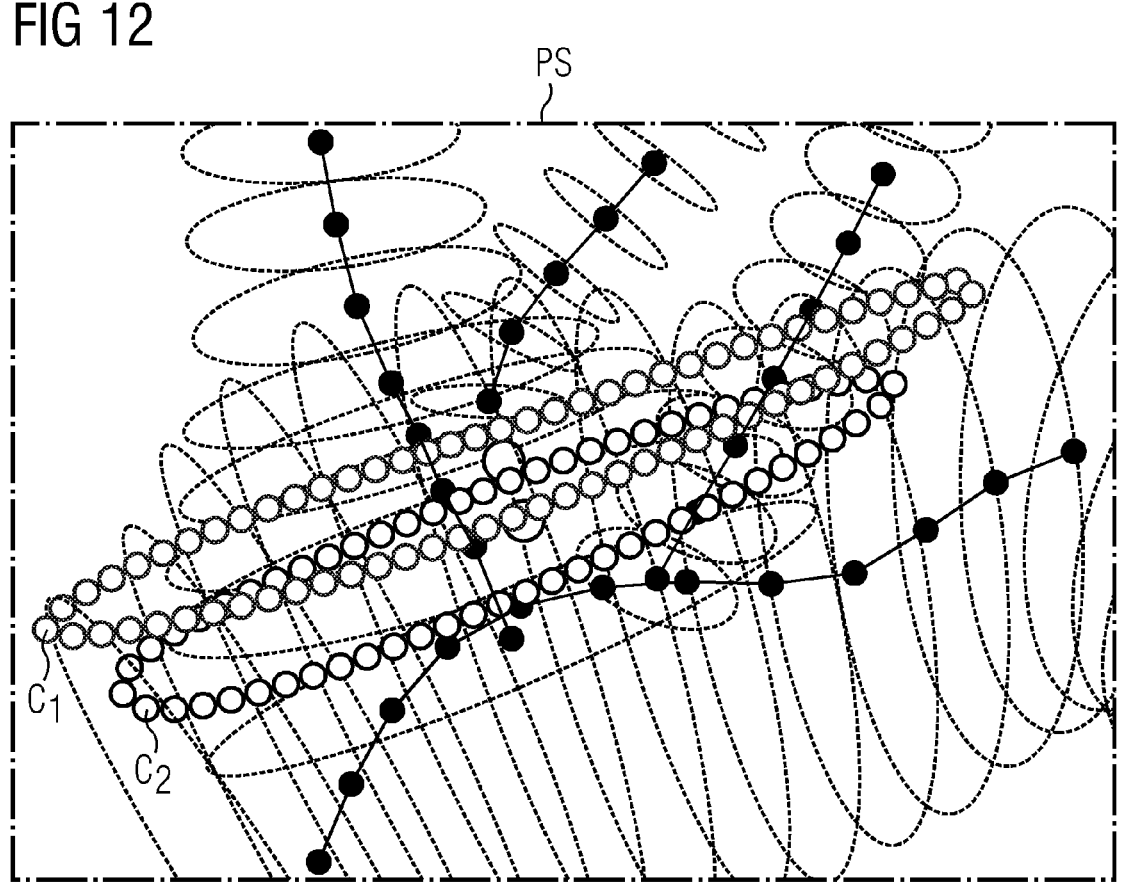
FIG. 12 shows a detailed view of an extract from the center line depiction from FIG. 11 including the two highlighted contours.

This marked extract is magnified in FIG. 12 such that the contours C1, C2 are shown in greater detail. In this case, it is evident that the approximation locally of the surface shape of the arterial blood vessel tree by a segment object 20 in the form of a truncated cone for the depicted series of contours C1, C2 is relatively rudimentary.

Figure 13:
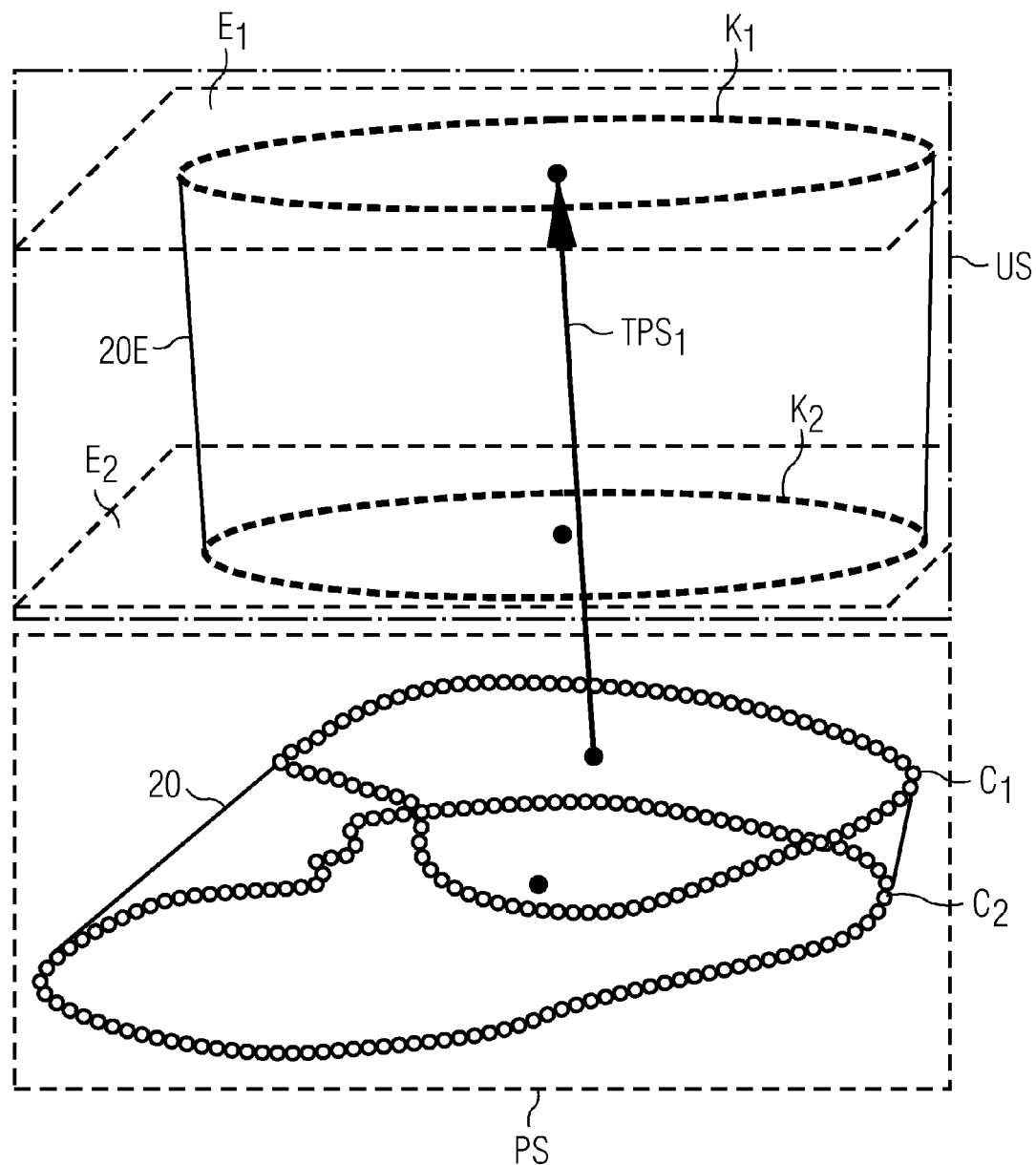
FIG. 13 shows an example embodiment for the transformation of two non-intersecting contours from a source space into a unit space.

FIG. 13 shows an improved possibility for the simple creation of a boundary surface network, e.g. using the method described above, even if the surface of the bronchial tree is described by complex freeform contours C1, C2.

For this purpose, a transformation function TPS1 from the source space PS (in the world coordinates system) into a unit space US is determined for the contours C1, C2, wherein the transformation function TPS1 transforms the contours C1, C2 into the unit space US in a plane E1, E2 in each case.

In this case, the consecutive contours C1, C2 that have been established in the source space PS are each reproduced in the unit space by the transformation function TPS1, on contours that have a circular boundary edge K1, K2 in the respective plane E1, E2.

Furthermore, the boundary edges K1, K2 here establish an essentially cylindrical or oblique cylindrical unit space segment object 20E, since the corresponding planes E1 and E2 are so disposed as to be essentially parallel to each other in the unit space. This means that the boundary edges K1, K2 have no shared points in the example embodiment shown in FIG. 13.

Interval calculations relating to the unit space segment object 20E are therefore easily possible for query points of the unit space, since the signed interval function of the unit space segment object 20E can be defined on the basis of the closed function or the set of simple boundary surfaces. The advantages described above in respect of the use of primitives when specifying a local signed distance function can therefore be transferred to the unit space segment objects 20E. The mathematically complicated interpolation of the surface of freeform contours for calculating a segment object, which would otherwise be necessary in the source space PS according to the previously described method for generating a boundary surface network, is therefore avoided in the unit space without thereby producing any essential disadvantages.

It is advantageous in this case that according to the above described method for determining a boundary surface network, an element of relative positional information for a query point of the world coordinates system (i.e. indicating whether the point lies inside, outside or on the surface of the object) can be sufficient to derive a breakdown structure depiction and determine a boundary surface network of a tubular object.

In the example embodiment, the transformation functions TPS1, TPS2 are based on a so-called thin-plate spline transformation. Such transformations are known in principle to a person skilled in the art. A description can be found e.g. in IEEE Transactions On Pattern Analysis and Machine Intelligence, Vol. 11, No. 6, June 1989: 'Principal Warps: Thin-Plate Splines and the Decomposition of Deformations', the entire contents of which are hereby incorporated herein by reference. These transformations from the source space PS into the unit space US do not preserve distance, but it is only crucial for the relative positional information to be preserved during the transformation into the unit space. In other words, query points that are disposed outside a segment object in the source space PS, said segment object being established by the contours C1, C2, are also disposed outside the unit space segment object 20E in the unit space US after transformation into the unit space US by means of the transformation function TPS1 or TPS2. An equivalent point correspondence also exists for query points on the surface or for query points inside the segment object that is established by the contours C1, C2.

A signed local distance function LF that is defined in the unit space US for the surface of the unit space segment object 20E expresses this positional information for query points in the unit space US.

With regard to query points of the source space PS, in order to preserve relative positional information relating to the segment object 20 that is defined by the contours C1, C2, it is sufficient for the query point likewise to be transformed from the source space PS into the unit space US by means of the transformation function, and for an interval relating to the unit space-segment object 20E to be determined by means of the signed local distance function. The operational sign of the local signed local distance function in the unit space US expresses this required relative positional information.

This approach therefore makes it possible unambiguously to assign relative positional information concerning a segment object 20 in the source space PS to a query point in the source space PS, without the surface of the segment object 20 being described at all in the source space PS. Interpolation of segment objects 20 in the source space PS (e.g. in the world coordinates system) on the basis of freeform contours is therefore not required for the purpose of creating the relative positional information.

Figure 14:
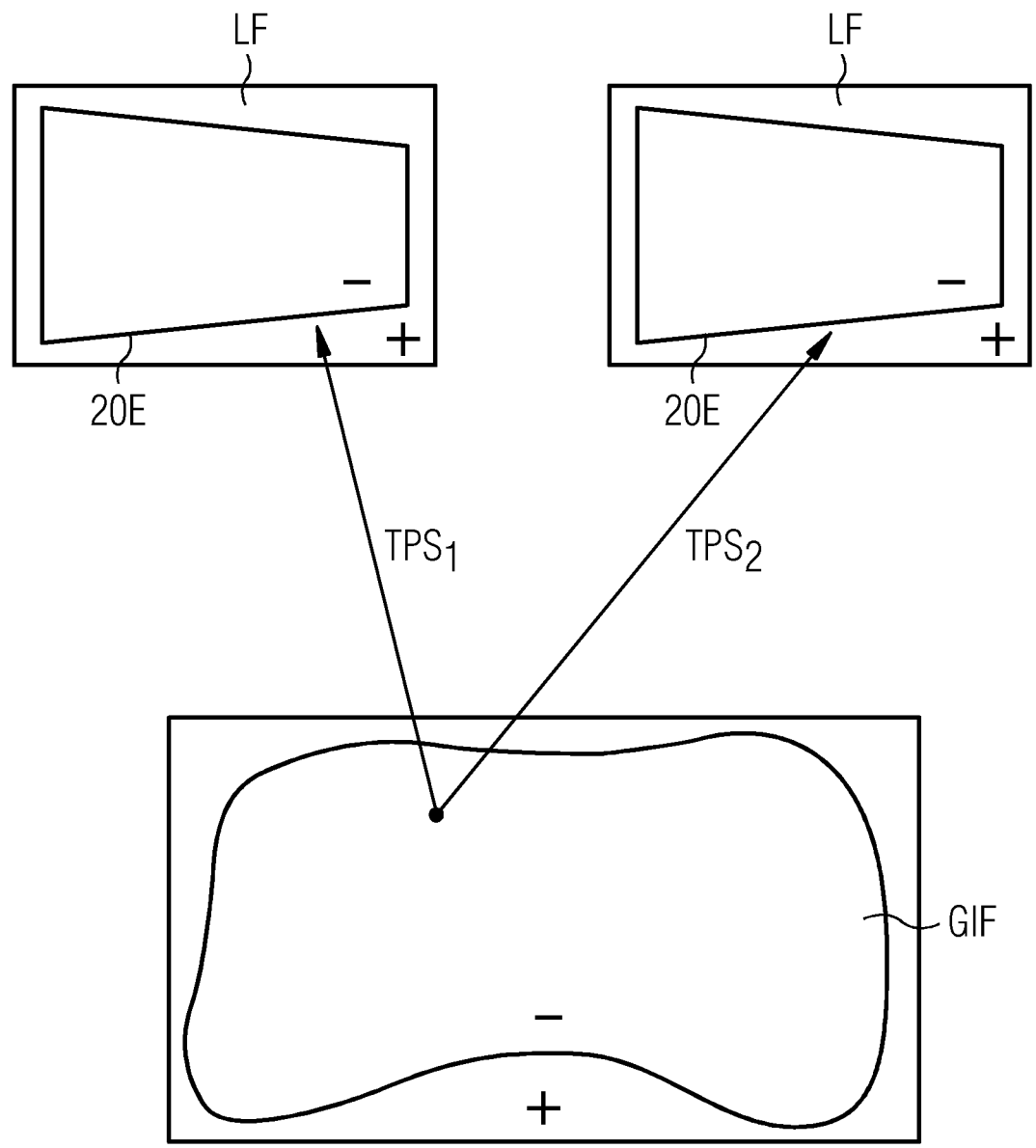
FIG. 14 shows an example embodiment for the specification of a global indicator function.

FIG. 14 shows a global indicator function being specified for query points in the source space PS, wherein said global indicator function can offer various advantages when specifying the boundary surface network, as mentioned above. For example, it is possible to specify whether a further breakdown of octree cells is beneficial. Furthermore, the global indicator function can also be used to derive the boundary surface network by means of the 'marching cubes' method.

Every query point that is disposed inside a boundary cuboid 30 in the source space PS can be assigned a function value of the global indicator function GIF. The boundary cuboid includes a plurality of contours in the source space PS, on the basis of which a unit space segment object 20E is assigned in each case in a plurality of unit spaces US. Each of the unit space segment objects 20E in the various unit spaces US is assigned an individual transformation function TPS1, TPS2 in this case.

Separations from the surface of the unit space segment objects 20E in the associated unit space US are likewise described by a local signed distance function LF in this case. Query points lying inside the volume of the unit space segment object 20E in the unit space US are again assigned negative function values of the local signed distance function LF in this case.

The global indicator function GIF for a query point in the boundary cuboid 30 is now determined by transformation of the query point into each of the plurality of unit spaces US by means of the individual transformation functions TPS1, TPS2 of the plurality of unit space segment objects 20E. An interval value to the surface of the respective unit space segment object 20E can be calculated for the transformed query point in each case by means of the respective local signed distance function LF in each of the unit spaces US. For the query point, the global indicator function GIF is then assigned the minimal function value of the local signed distance function LF in relation to the transformed query points. This can also mean that the global indicator function GIF is formed solely from the operational sign of the minimal function value if the minimal function value is not zero. In the same way, the global indicator function GIF would otherwise have to be formed on the basis of the maximum of the local signed distance functions for the transformed query point if the local signed distance function LF assigns a positive interval value from the surface of the unit space segment object to query points lying inside the volume of the unit space segment object 20E.

A boundary surface network can be created rapidly by way of the global indicator function GIF determined thus, in particular as described in connection with FIG. 10. At the same time, the global indicator function GIF provides a rapidly calculable, unambiguous, model-based description of the surface of tubular object sections having complicated shapes (i.e. simply by way of all points at which the global indicator function GIF is zero), without the need for segment objects having complicated shapes to be depicted using interpolation.

Figure 15:
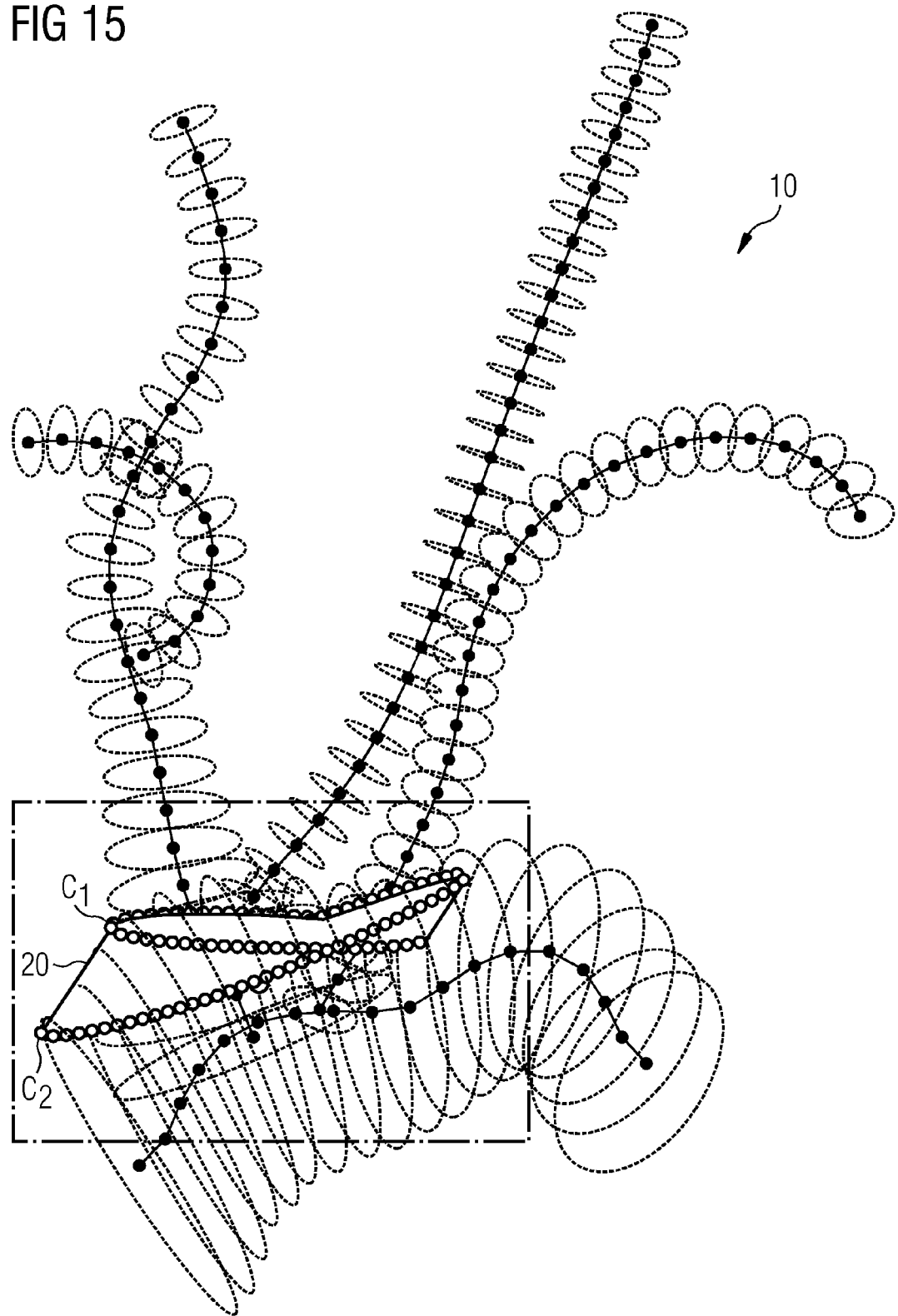
FIG. 15 shows an example embodiment for a center line depiction comprising an ordered series of contours for a section of a bronchial tree as per FIG. 11, though two intersecting contours are highlighted in this case.
Figure 16:
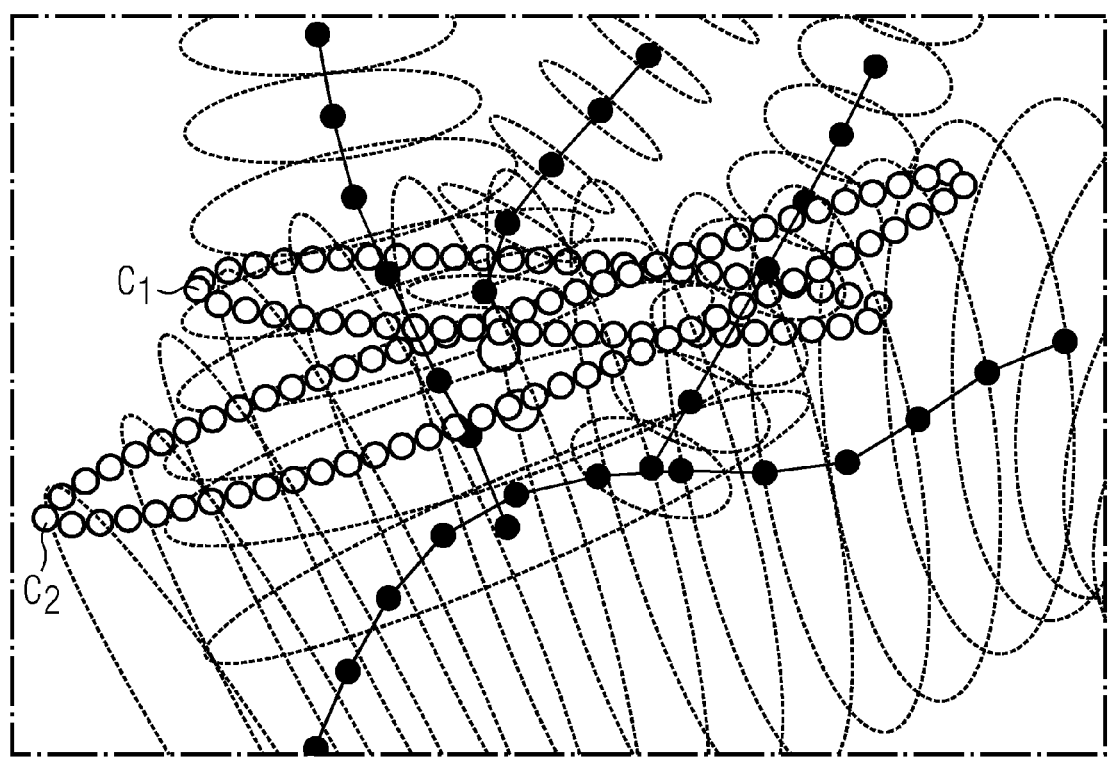
FIG. 16 shows a detailed view of an extract from the center line depiction from FIG. 15 including the two highlighted contours.
Figure 17:
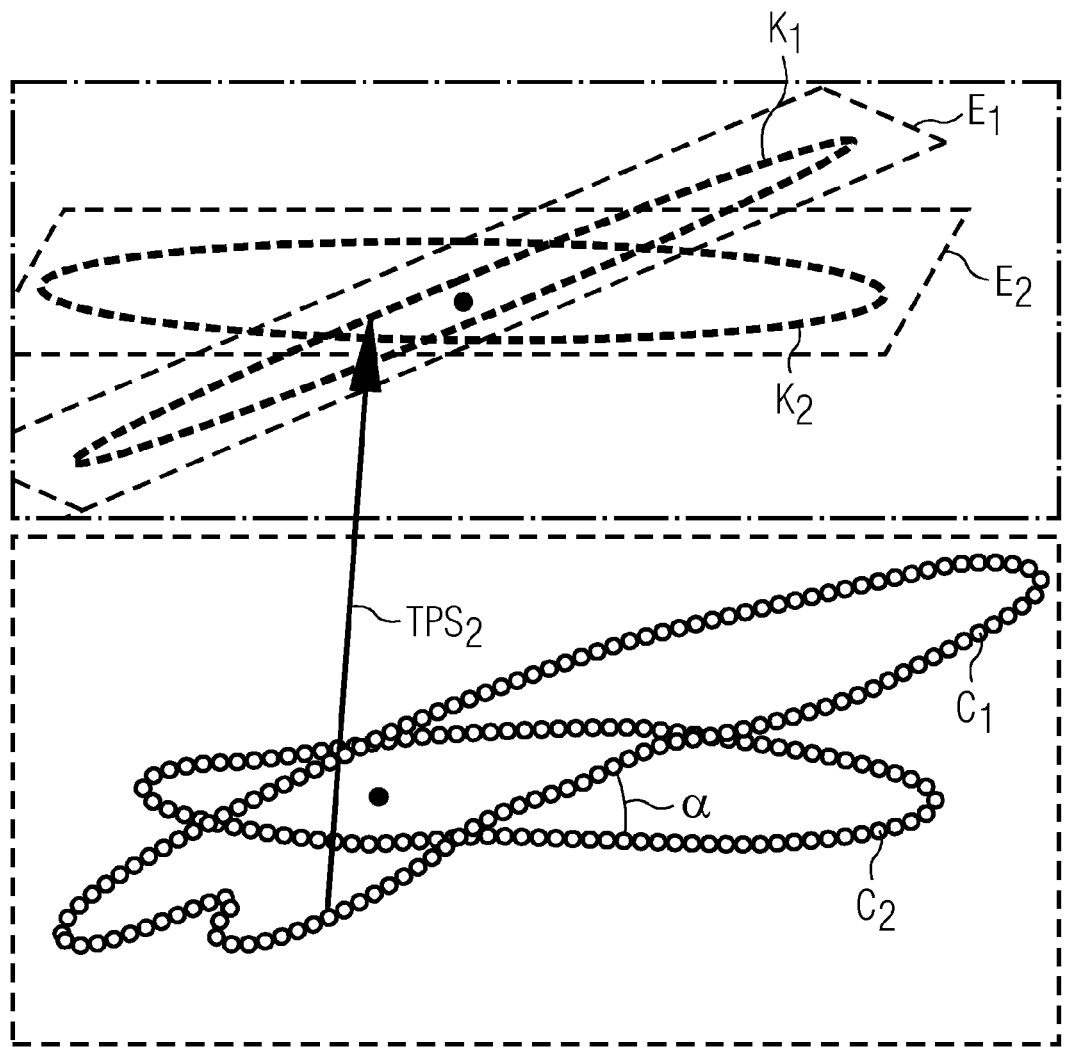
FIG. 17 shows a further example embodiment for the transformation of contours into a unit space as per FIG. 13, but for two intersecting contours.

The fact that this approach also takes complicated sections, e.g. branches, of the tubular object into consideration is illustrated by means of FIGS. 15 to 17 in particular.

FIG. 15 again shows an extract from an arterial vascular system in the source space PS as in FIG. 11. In this case, in the center line depiction 10, two immediately consecutive contours C1, C2 are marked in a branch region. A model-based description of this section of the arterial blood vessel system by means of segment objects 20 in the source space PS would require the adaptation of a multiplicity of segment objects. However, the depiction of this section in the unit space US can reduce the number of segment objects required, thereby again accelerating the specification of the boundary surface network.

As shown by the detailed extract (a magnification of the dash-dot marked region from FIG. 15) of the arterial blood vessel system depicted in FIG. 16 in particular, the highlighted contours C1, C2 intersect each other in the source space PS. This means that a very complicated segment object would be required here for the purpose of local modeling between the contours C1, C2 in the source space PS.

FIG. 17 shows the transformation of the intersecting contours C1, C2 from the source space PS into the unit space US by way of an individual transformation function TPS2.

Here likewise, the contours C1, C2 are again transformed onto circular boundary edges K1, K2 in the unit space. In this case, the boundary edges in the unit space US again lie in a plane E1, E2 that is assigned to the respective boundary edge. These planes E1, E2 intersect each other (as in the source space PS) in the unit space US at an angle α and are therefore so disposed as to be tilted relative to each other, and the boundary edges K1, K2 have a plurality of shared points (specifically on the intersection line of the two planes E1, E2), as applies likewise to the associated contours C1, C2 in the source space PS.

It is also possible for boundary edges K1, K2 that are tilted relative to each other to have only one shared point in the unit space US, i.e. if the boundary edges K1, K2 in the unit space US (and the contours C1, C2 in the source space PS accordingly) merely touch. It is moreover also conceivable for boundary edges that are tilted relative to each other to have no shared points in the unit space, e.g. if the associated contours C1, C2 in the source space PS likewise do not intersect each other.

In each of these cases, however, it is easily possible to form and describe the surface of the unit space segment object 20E which is established by way of tilted planes E1, E2 of the boundary edges K1, K2 in the unit space. In this case, the resulting space segment objects 20E can always be described at least partly by surface sections of the circumferential surface of a truncated cone or a cylinder. The shortest connections between the different boundary edges K1, K2 in the unit space US establish these circumferential surface sections. This allows a simple description of the surface of the unit space segment object 20E, such that it is possible to realize the described advantages of a rapid calculation of the signed local distance function LF, which can be used as described above for determining a boundary surface network of the signed distance function.

Finally, FIG. 19 provides a basic schematic depiction of a boundary surface network determination system 300, by which the boundary surface network can be determined in the manner described above. The boundary surface network determination system 300 is preferably realized on a computer system or a combination of computer systems here, and comprises a breakdown structure determination system 380 that has an input interface 310 and a breakdown structure determination unit 320 here.

A center line depiction 10 that is specified on the basis of image data of the tubular object is captured by way of the input interface 310. This center line depiction 10 is present in the form of a data record and is supplied to the breakdown structure determination system 300 in digital format via the input interface 310. In this case, the center line depiction 10 comprises contours of the tubular object in an ordered series in a source space as described above, local measurement information elements 15 of the tubular object being associated with said contours.

Furthermore, the input interface 310 can also be so designed as to capture further settings that can be input by a user for the boundary surface network determination system 300 or the breakdown structure determination system 380. For this purpose, it can comprise e.g. a keyboard, a touchscreen, a mouse or similar, or be connected to such a device. For example, the aforementioned 'quality factor' can be supplied to the system via the input interface 310, such that it can be changed as required by an operator.

The center line depiction 10 and local measurement information 15 that are captured by way of the input interface 310 are transferred to the breakdown structure determination unit 320 which, on the basis of the center line depiction 10 and the local measurement information 15, determines and provides an octree 100 comprising breakdown cells for the tubular object as described above.

As part of the breakdown structure determination unit 320, the boundary surface network determination system 300 also comprises a segment object determination unit 350, which can determine one or more unit space segment objects 20E in a unit space on the basis of contours of the center line depiction 10, said contours being consecutive in each case. For this purpose, the segment object determination unit 350 is so designed as to specify a dedicated transformation function TPS1, TPS2 for transformation from the source space into the unit space for each of the unit space segment objects 20E as explained above.

The unit space segment objects 20E and the transformation functions TPS1, TPS2 are supplied to a distance determination unit 360, which calculates a local distance function in the unit space for each unit space segment object. The distance determination unit 360 further comprises a position determination unit 365, which provides a global indicator function for query points in the source space on the basis of the local signed distance function as explained above.

All of the components 350, 360, 365 of the breakdown structure determination unit 320 make it possible to obtain at least the required relative positional information for the various query points very rapidly, even in the case of complicated freeform contours as described above, in order to allow optimal calculation of the octree 100. A multiplicity of analyses can then take place on the basis of the octree 100, and in particular a boundary surface network 1000 of the tubular object can be determined.

The boundary surface network determination system 300 comprises a network determination unit 330 for this purpose. The octree 100 that is determined by means of the breakdown structure determination system 380 is supplied to this network determination unit 330, which determines the desired boundary surface depiction 1000 of the tubular object on the basis of the octree 100 by way of a marching cubes algorithm.

The boundary surface network 1000 thus determined is supplied to the user of the boundary surface network determination system 300 via an output interface 340. The output interface 340 can be e.g. a display device such as a monitor or the like. However, the boundary surface network 1000 is preferably supplied via said output interface 340 to a storage entity, a network and/or a further handling entity for further processing of the boundary surface network 1000.

The breakdown structure determination system 380 and the other described components of the boundary surface network determination system 300 can be implemented individually or in combination, preferably as software components on a computer system.

It is clear from the foregoing description that a boundary surface network of a tubular object can be determined very rapidly and with great accuracy of (locally specific) detail by way of embodiments of the invention. In this case, it should be noted that the features of all example embodiments or developments disclosed in figures can be used in any desired combination. Finally, it should also be noted that the methods and systems described in detail above are merely example embodiments which can be modified in the widest variety of ways by a person skilled in the art, without thereby departing from the scope of the invention. Furthermore, the use of the indefinite article 'a' or 'an' does not preclude multiple instances of the features concerned. Likewise, the term 'unit' does not preclude the respective components consisting of a plurality of interacting subcomponents, which may also be spatially distributed if appropriate.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining a boundary surface network of a tubular object, comprising:
   providing an ordered series of contours on the basis of image data in a source space;
   specifying a transformation function for at least two consecutive contours in the ordered series, from the source space into a unit space, the unit space being a three-dimensional Euclidean space having a normalized length, width and height, and which is different from the source space;
   creating a unit space segment object in the unit space on the basis of the at least two consecutive contours;
   determining a local signed distance function in the unit space for the unit space segment object;
   determining relative positional information of a query point in the source space from a surface of a segment object in the source space, the segment object being based on the consecutive contours, on the basis of the local signed distance function in the unit space and using the transformation function; and
   creating the boundary surface network on the basis of the determined relative positional information; wherein the contours are freeform contours.

2. The method of claim 1, wherein each unit space segment object is assigned a dedicated transformation function for transformation into the unit space.

3. The method of claim 1, wherein the contours in each case are transformed into a circular boundary edge which lies in a plane in the unit space in each case, and wherein the space segment object comprises the boundary edges of the contours.

4. The method of claim 3, wherein the unit space segment object is bounded at least sectionally by a circumferential surface that is formed by the shortest connections between two boundary edges of the contours.

5. The method of claim 4, wherein the planes of the boundary edges in the unit space are so disposed as to be tilted by an angle relative to each other.

6. The method of claim 4, wherein the boundary edges of two different contours include one or more shared points in the unit space.

7. The method of claim 3, wherein the planes of the boundary edges in the unit space are so disposed as to be tilted by an angle relative to each other.

8. The method of claim 3, wherein the boundary edges of two different contours include one or more shared points in the unit space.

9. The method of claim 1, wherein values of the signed distance function represent separations in the unit space from the surface of the unit space segment object.

10. The method of claim 1, wherein a global position indicator function is determined for a plurality of unit space segment objects on the basis of the signed distance functions of the unit space segment objects.

11. The method of claim 1, further comprising:
   providing a representation of the tubular object on the basis of the image data, wherein the representation includes the ordered series of contours;
   providing local measurement information for points of the representation;
   creating a breakdown structure depiction of the tubular object by way of breakdown cells including different spatial extents, based on the local measurement information; and
   deriving a boundary surface network on the basis of the created breakdown structure depiction.

12. A computer program product, including a non-transitory computer-readable storage medium storing sections of program code that, when executed, cause at least one processor at a boundary surface network determination system to perform the method of claim 1.

13. The method of claim 1, wherein the tubular object is a hollow organ.

14. A non-transitory computer readable medium including program segments for, when executed on at least one processor at a boundary surface network determination system, causing the boundary surface network determination system to implement the method of claim 1.

15. The method of claim 1, wherein the source space is based on a measurement space of an imaging system used to obtain the image data.

16. A boundary surface network determination system for determining a boundary surface network of a tubular object, comprising
   an input interface, configured to supply an ordered series of contours on the basis of image data;
   a segment object determination unit including a computer system configured to execute computer-readable instructions to
   specify a transformation function for respectively transforming consecutive contours in the ordered series of contours from a source space into a unit space, the unit space being a three-dimensional Euclidean space having a normalized length, width and height, and which is different from the source space, and
   create a unit space segment object in the unit space on the basis of the consecutive contours;
   a distance determination unit, configured to determine a separation from a unit space segment object on the basis of a signed distance function established for each segment object in the unit space;
   a position determination unit, configured to determine relative positional information of a query point in the source space from a surface of a segment object in the source space, said segment object being based on the consecutive contours, on the basis of the local signed distance function; and
   an output interface, configured to supply a boundary surface network on the basis of a multiplicity of relative positional information determined via the position determination unit; wherein the contours are freeform contours.

17. The boundary surface network determination system of claim 16, wherein the tubular object is a hollow organ.

* * * * *